US006922775B2

(12) United States Patent
Kikuchi et al.

(10) Patent No.: US 6,922,775 B2
(45) Date of Patent: Jul. 26, 2005

(54) USER SUPPORT SYSTEM FOR CRYPTOGRAPHIC COMMUNICATION IN NETWORK SYSTEMS

(75) Inventors: Hiroaki Kikuchi, Sagamihara (JP); Yasutsugu Kuroda, Kawasaki (JP); Hideyuki Aikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 557 days.

(21) Appl. No.: 10/032,492

(22) Filed: Jan. 2, 2002

(65) Prior Publication Data

US 2002/0051544 A1 May 2, 2002

Related U.S. Application Data

(63) Continuation of application No. 08/805,090, filed on Feb. 24, 1997, now Pat. No. 6,584,563, which is a continuation of application No. 08/301,397, filed on Sep. 8, 1994, now abandoned.

(30) Foreign Application Priority Data

Dec. 3, 1993 (JP) .............................. 5-303960

(51) Int. Cl.[7] .............................................. H04L 9/12
(52) U.S. Cl. ....................... 713/154; 713/160; 713/162; 380/264
(58) Field of Search ................................ 713/154, 160, 713/162; 380/264; 705/65

(56) References Cited

U.S. PATENT DOCUMENTS

| 4,172,213 A | 10/1979 | Barnes ........................ 380/42 |
| 4,887,296 A | * 12/1989 | Horne ......................... 380/239 |
| 5,434,920 A | 7/1995 | Cox et al. .................... 380/49 |
| 5,442,708 A | 8/1995 | Adams, Jr. et al. ........... 380/49 |
| 5,544,246 A | * 8/1996 | Mandelbaum et al. ........ 705/65 |

FOREIGN PATENT DOCUMENTS

| EP | 281224 A2 | * 9/1988 | ............. H04L/9/00 |
| GB | 2 050 0221 | 12/1980 | ............. H04L/9/02 |

OTHER PUBLICATIONS

U.S. Appl. No. 08/301,397, filed Sep. 8, 1994, Kikuchi et al.
U.S. Appl. No. 08/805,090, filed Feb. 24, 1997, Kikuchi et al.
Boyd, C., "Modern data encryption" –see "Public key cryptography," Electronics & Communication Engineering Journal, Oct. 1993, pp. 271–278.
Notification of Reasons for Refusal (Japanese Office Action) issued by Japanese Patent Office on Aug. 2, 2001.
"Design of E–Mail System Based on Security Requirements", Technical Report of The Proceeding of The Institute of Electronics, Information and Communication Engineers, vol. 91, No. 138 (IN91–60), pp. 169–173 (1991).
"The Role of Trust in Protected Mail", Proceedings of IEEE Computer Society Symposium on Research in Security and Privacy, pp. 210–215 (1990).

* cited by examiner

*Primary Examiner*—Justin T. Darrow
(74) *Attorney, Agent, or Firm*—Staas & Halsey LLP

(57) ABSTRACT

A user support system for cryptographic communication includes a key storage for storing keys used for deciphering, a deciphering part for deciphering an enciphered communication text into a deciphered communication text using a key, and a controller for starting the deciphering part only when an input communication text is the enciphered communication text and for supplying the key that is necessary for the deciphering in the deciphering part by retrieving the key from the key storage.

2 Claims, 22 Drawing Sheets

| USER NAME | PUBLIC KEY |
|---|---|
| SYSTEM A | AA···A |
| SYSTEM B | BB···B |
| ········ | ········ |

USER SUPPORT SYSTEM FOR CRYPTOGRAPHIC COMMUNICATION IN NETWORK SYSTEMS

This application is a continuation of application Ser. No. 08/805,090 filed Feb. 24, 1997, now U.S. Pat. No. 6,584,563, which is a continuation of application Ser. No. 08/301,397, filed Sep. 8, 1994, now abandoned.

BACKGROUND OF THE INVENTION

The present invention generally relates to user support systems for cryptographic communication, and more particularly to a user support system for cryptographic communication wherein a communication is made by enciphering and deciphering the communication in a network system.

When making a communication in a network system in which an unspecified large number of computers are connected, there is a possibility that the communication content is tapped at a repeater site or, the communication is made by a person identifying himself as the authorized user. Because of such possibilities, it is necessary to guarantee the security of the communication by enciphering the communication or, adding to the communication content a certificate or proof which is given by a third party and certifies or proves that the signature of the sender is that of himself, that is, the authorized user.

Various enciphering systems have been proposed. According to the DES system, a secret key which is common between the communicating users is prepared, and the enciphering is made by use of this secret key. The processing speed of this DES system is high, but the secret key must be held for each communicating user thereby making the key management difficult.

On the other hand, the RSA system prepares a secret key corresponding to a public key, and the enciphering is made by use of the public key or the secret key. The deciphering is made using the secret key when the enciphering is made using the public key, and the deciphering is made using the public key when the enciphering is made using the secret key. The number of required keys can be reduced according to this RSA system, however, the processing speed is low and a long processing time is necessary.

Accordingly, the PEM system which combines the DES system and the RSA system has been proposed.

FIG. 1 shows an example of a conventional cryptographic communication system employing the PEM system. The PEM system enciphers the mail text by a DES secret key according to the DES system, and enciphers this DES secret key by a public key of the receiving user according to the RSA system. The DES secret key is a session key which is generated at random using time information and the like when enciphering the mail. The receiving user obtains the mail, including the enciphered mail text of the transmitting user and the DES secret key, by a secret key of the receiving user. In other words, the receiving user deciphers the DES secret key using the DES secret key, and deciphers the enciphered mail text by using the deciphered DES secret key.

In FIG. 1, it is assumed for the sake of convenience that the cryptographic communication employing the PEM system is made from a transmitting (or sending) user A of a transmitting (or sending) system S to a receiving user B of a receiving system R so as to transmit a mail text (communication text) 300.

In the transmitting system S, a DES secret key 301 is generated at random using time information and the like when enciphering the mail text 300 according to the DES system. A public key 301' of the user B is made by the user B and made public to the user A. A secret key of the user B, made in advance and secretly held by the user B is provided in correspondence with the public key of the user B.

In FIG. 1, a process 302 enciphers the mail text 300 according to the DES system using the DES secret key 301. A process 303 enciphers the DES secret key 301 according to the RSA system using the public key of the user B. Transmitting information 304 is the information to be transmitted in the network.

An enciphered DES secret key 305 is the DES secret key 301 which has been enciphered according to the RSA system. An enciphered mail text 306 is the mail text 300 which has been enciphered according to the DES system using the DES secret key 301.

On the other hand, in the receiving system R, A secret key 307 of the user B is secretly held in correspondence with the public key of the user B. A process 307' deciphers the enciphered DES secret key 301 which has been enciphered according to the RSA system, using the secret key 305 of the user B. A process 308 deciphers the enciphered mail text 306 which has been enciphered according to the DES system, using the deciphered DES secret key 301. A deciphered mail text 309 is the mail text which is obtained by the deciphering process 308.

In the PEM system shown in FIG. 1, the transmitting user A of the transmitting system S makes the enciphered mail to be transmitted to the receiving user B of the receiving system R, and the receiving user B deciphers the enciphered mail in the following manner.

First, the transmitting user A makes the mail text 300, and starts an enciphering unit. The transmitting user A generates the DES secret key 301 by a secret key generator which is not shown in FIG. 1 but will be described later in conjunction with FIG. 3A, and enciphers the mail text 300 according to the DES system using the DES secret key 301. Then, the transmitting user A obtains the public key 301' of the receiving user B, and enciphers the DES secret key 301 according to the RSA system using the public key 301' of the receiving user B. Usually, the public key 301' of the receiving user B is stored in a file such as a floppy disk.

The enciphered mail text 306 which has been enciphered according to the DES system and the enciphered DES secret key 305 which has been enciphered according to the RSA system are transmitted to the receiving user B.

The user B starts a deciphering unit when the receiving user B confirms that the enciphered mail text 306 is being transmitted to the receiving user B. The receiving user B obtains his own secret key 307 which corresponds to the public key made public to the transmitting user A, and uses this secret key 307 to decipher the DES secret key 305 which has been enciphered using the public key of the receiving user B. Usually, the secret key 307 is secretly stored in a floppy disk or the like. In addition, the deciphered mail text 309 is output.

FIG. 2 shows an example of a conventional cryptographic communication system employing a signature check system. According to the signature check system, the transmitting user A enciphers the mail text, and adds his signature when transmitting the enciphered mail text to the receiving user B.

In the transmitting system S shown in FIG. 2, a mail text 330 is to be transmitted to the receiving user B. A secret key 331 of the transmitting user A is formed in advance by the transmitting user A in correspondence with the public key of the transmitting user A, and is secretly stored in a floppy disk or the like. A public key 332 of the transmitting user A is formed by the transmitting user A and is made public to the destination of the communication, that is, the receiving user B. The public key 332 of the transmitting user A corresponds to the secret key 331 of the transmitting user A.

A digest 333 is regarded as the signature of the transmitting user A, and is obtained by subjecting the mail text 330 to a data compression. This digest 333 is enciphered into an enciphered digest 334 according to the RSA system using the secret key 331 of the transmitting user A. This enciphered digest 334 is regarded as an electronic signature of the transmitting user A.

An enciphering unit 340 enciphers the mail text 330 according to the PEM system, into an enciphered mail text 341.

On the other hand, in the receiving system R, a process 335 deciphers the received signature using the public key 332 of the transmitting user A, and a deciphered digest 336 is obtained. A deciphering unit 342 employs the PEM system and deciphers the enciphered mail text 341 which is transmitted from the transmitting user A into a deciphered mail text 343. A digest 344 of the deciphered mail text 343 is obtained by subjecting the deciphered mail text 343 to a data compression.

A collating process 345 compares the deciphered digest 336 which is obtained by deciphering the enciphered digest 334 using the public key 332 of the transmitting user A and the digest 344 of the deciphered mail text 343 which has been deciphered in the deciphering unit 342. The collating process 345 makes this comparison so as to check the signature.

In FIG. 2, the transmitting user A first makes the mail text 330. This mail text 330 is subjected to a data compression and regarded as the signature of the transmitting user A, and the transmitting user A further enciphers the compressed mail text using the secret key 331 of the transmitting user A. The enciphered signature of the transmitting user A is transmitted to the receiving user B. On the other hand, the mail text 330 is enciphered in the enciphering unit 340, and the enciphered mail text 341 is transmitted to the receiving user B.

In the receiving system R, the receiving user B obtains the public key 332 of the transmitting user A (corresponding to the secret key 331 of the transmitting user A) which is received in advance, and obtains the deciphered digest 336 by deciphering the signature of the transmitting user A (enciphered digest 334) using the public key 332 of the transmitting user A.

On the other hand, the receiving user B receives the enciphered mail text 341 which is transmitted from the transmitting user A, and deciphers this enciphered mail text 341 in the deciphering unit 342. The receiving user B then forms the digest of the deciphered mail text 343. In addition, the deciphered digest 336 which is obtained from the enciphered digest (signature) 334 and the digest 344 which is formed from the deciphered mail text 343. If the two compared digests 336 and 344 match, it is regarded that the signature is correct. But it is regarded that the signature is incorrect if the two compared digests 336 and 344 do not match.

FIGS. 3A and 3B are diagrams for explaining the constructions of a conventional enciphering unit and a conventional deciphering unit.

The enciphering unit shown in FIG. 3A enciphers a mail text 350. A storage 351 stores the public key of the transmitting user A. A storage 352 stores a secret key of the transmitting user A in correspondence with the public key of the transmitting user A. A DES secret key generator 353 generates a secret key (session key) at random using random numbers, time information and the like when making the enciphering process according to the DES system.

A storage 354 stores a public key of the receiving user B. A signature part 356 forms a digest of the mail text 350 and enciphers this digest using the secret key of the transmitting user A. An enciphering part enciphers the mail text 350 according to the DES system. An output part 358 outputs the enciphered signature of the transmitting user A and the enciphered mail text to the network.

The deciphering unit shown in FIG. 3B deciphers the enciphered mail 360 which is transmitted from the transmitting user A. A normal mail 361 has not been enciphered. A spool file 362 is a file common to the network on the receiving end, and stores the enciphered mail 360 and the received normal mail 361. A mail box 363 is a file which stores a mail intended for the receiving user B, that is, the mail having the receiving user B as its destination.

A deciphering part 364 inputs the enciphered mail intended for the receiving user B, and deciphers the enciphered mail using the secret key of the receiving user B or the like that is necessary for the deciphering process. A storage 366 stores the public key of the transmitting user A. A signature check part 367 deciphers the signature of the enciphered mail intended for the receiving user B using the public key of the transmitting user A, and checks the signature. A deciphered mail output part 368 outputs the deciphered mail text and the signature check result.

According to the conventional cryptographic communication systems, complicated key management was required at the transmitting user A who enciphers the mail and at the receiving user B who deciphers the enciphered mail, in order to provide complete security from the transmitting user A to the receiving user B. In addition, it was necessary to carry out the troublesome process of starting the enciphering unit and starting the deciphering unit every time the communication is made. As a result, there were problems in that the complicated key management and troublesome operations are required.

SUMMARY OF THE INVENTION

Accordingly, it is a general object of the present invention to provide a novel and useful user support system for cryptographic communication, in which the problems described above are eliminated.

Another and more specific object of the present invention is to provide a user support system for cryptographic communication comprising key storage means for storing keys used for deciphering, deciphering means for deciphering an enciphered communication text into a deciphered communication text using a key, and control means for starting the deciphering means only when an input communication text is the enciphered communication text and for supplying the key that is necessary for the deciphering in the deciphering means by retrieving the key from the key storage means. According to the user support system of the present invention, the cryptographic communication can be made without the user having to start the enciphering unit. In addition, the key management is simple, so that the user does not have to be aware of the key necessary for the enciphering when making the cryptographic communication. Therefore, the user can make the communication between the networks safely and in a simple manner by only making a normal communication text.

Still another object of the present invention is to provide the user support system described above which further comprises enciphering means for enciphering a communication text into an enciphered communication text which is to be transmitted using a key, where the key storage means further stores keys used for enciphering, and the control means starts the enciphering means only when an input communication text is the communication text to be transmitted by a cryptographic communication and for supplying the key that is necessary for the enciphering in the enciphering means by retrieving the key from the key storage means. According to the user support system of the present invention, the cryptographic communication can be made without the user having to start the deciphering unit. In addition, the key management is simple, so that the user does not have to be aware of the key necessary for the deciphering when making the cryptographic communication. Therefore, the user can make the communication between the networks safely and in a simple manner by only making a normal communication text.

A further object of the present invention is to provide a user support system for cryptographic communication in a network system in which a first system and a second system are connected via an external network, comprising an enciphering unit, provided in the first system, enciphering a communication text to be output to the external network, where the enciphering unit comprises a first receiver receiving the communication text which is made in the first system and is to be transmitted via the external network, a first key storage storing keys necessary for a cryptographic communication, a first key retrieving part retrieving a key from the first key storage based on a destination of the communication text, an enciphering part enciphering the communication text into an enciphered communication text using the key retrieved by the key retrieving part, and a first transmitter transmitting the enciphered communication text from the enciphering part to the external network. According to the user support system of the present invention, the cryptographic communication can be made without the user having to start the enciphering unit. In addition, the key management is simple, so that the user does not have to be aware of the key necessary for the enciphering when making the cryptographic communication. Therefore, the user can make the communication between the networks safely and in a simple manner by only making a normal communication text.

Another object of the present invention is to provide the user support system described immediately above and further comprising a deciphering unit, provided in the second system, deciphering the enciphered communication text input via the external network, where the deciphering unit comprises a second receiver receiving a communication text input via the external network, a deciphered mail extracting part determining whether the communication text received by the second receiver is an enciphered communication text or a normal communication text and extracting the enciphered communication text, a second key storage storing keys necessary for the cryptographic communication, a second key retrieving part retrieving from the second key storage a key that is necessary for deciphering the enciphered communication text when the deciphered mail extracting part extracts the enciphered communication text, a deciphering part deciphering the enciphered communication text into a deciphered communication text using the key retrieved by the second key retrieving part, and a second transmitter transmitting the deciphered communication text from the deciphering part to a destination of the deciphered communication text within the second system. According to the user support system of the present invention, the cryptographic communication can be made without the user having to start the deciphering unit. In addition, the key management is simple, so that the user does not have to be aware of the key necessary for the deciphering when making the cryptographic communication, Therefore, the user can make the communication between the networks safely and in a simple manner by only making a normal communication text.

Still another object of the present invention is to provide a user support system for cryptographic communication in a network system in which a first system and a second system are connected via an external network, comprising a deciphering unit, provided in the second system, deciphering the enciphered communication text input via the external network, where the deciphering unit comprises a receiver receiving a communication text input via the external network, a deciphered mail extracting part determining whether the communication text received by the receiver is an enciphered communication text or a normal communication text and extracting the enciphered communication text, a key storage storing keys necessary for the cryptographic communication, a key retrieving part retrieving from the key storage a key that is necessary for deciphering the enciphered communication text when the deciphered mail extracting part extracts the enciphered communication text, a deciphering part deciphering the enciphered communication text into a deciphered communication text using the key retrieved by the key retrieving part, and a transmitter transmitting the deciphered communication text from the deciphering part to a destination of the deciphered communication text within the second system. According to the user support system of the present invention, the cryptographic communication can be made without the user having to start the deciphering unit. In addition, the key management is simple, so that the user does not have to be aware of the key necessary for the deciphering when making the cryptographic communication. Therefore, the user can make the communication between the networks safely and in a simple manner by only making a normal communication text.

Other objects and further features of the present invention will be apparent from the following detailed description when read in conjunction with the accompanying drawings.

DESCRIPTION OF THE PREFERRED EMBODIMENTS

When both the transmitting and receiving ends form a network such as a local area network (LAN) and each network forms a LAN by connecting to an external network having an unspecified large number of users, the danger of tampering, tapping and the like of the communication content exists in the external network, and not in the network at the transmitting end nor the network at the receiving end. The present invention focuses on this point, and facilitates the cryptographic communication in such a network system in which the network at the transmitting end and the network at the receiving end are connected to external network.

Figure 1:
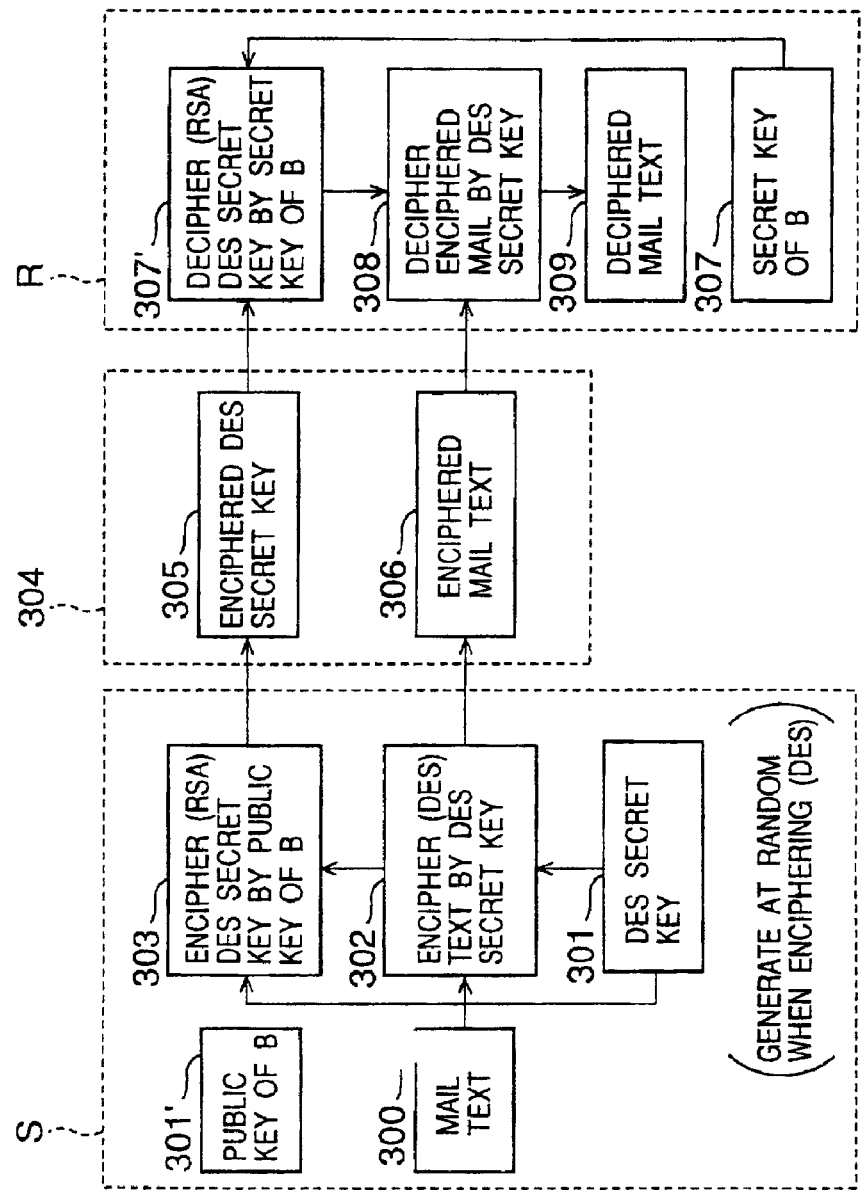
FIG. 1 is a system block diagram showing an example of a conventional cryptographic communication system employing the PEM system.
Figure 2:
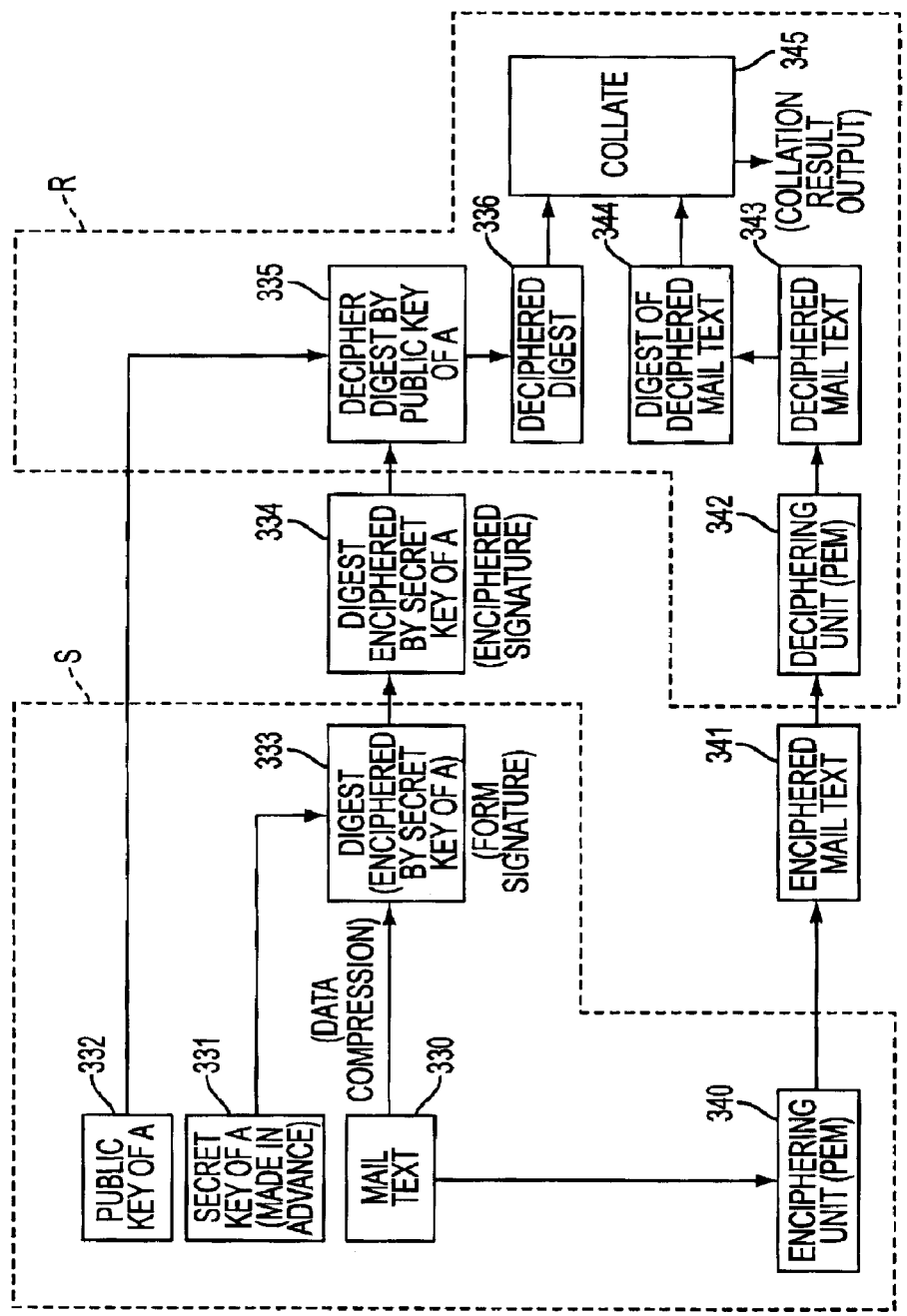
FIG. 2 is a system block diagram showing an example of a conventional cryptographic communication system employing a signature check system.
Figure 3A:
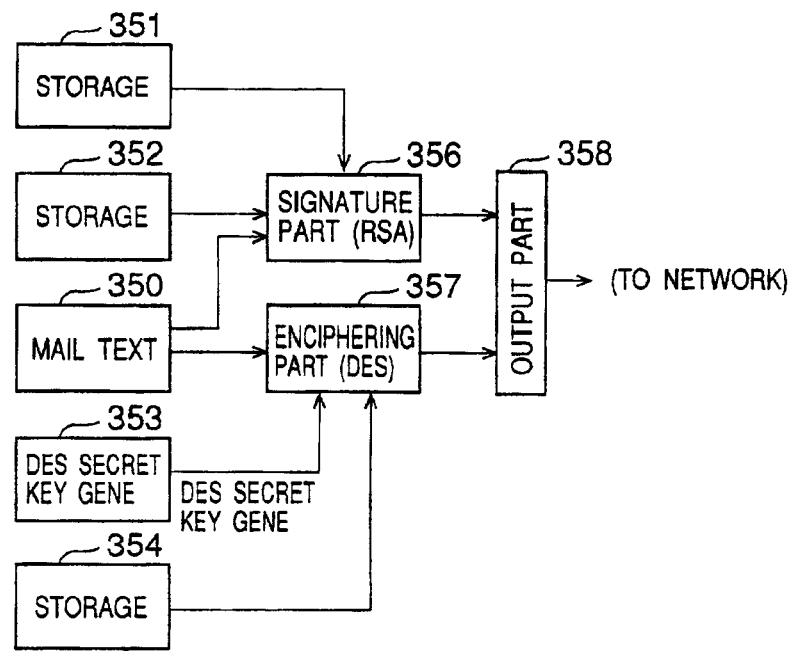
FIGS. 3A and 3B respectively are system block diagrams showing the construction of a conventional enciphering unit and a conventional deciphering unit.
Figure 3B:
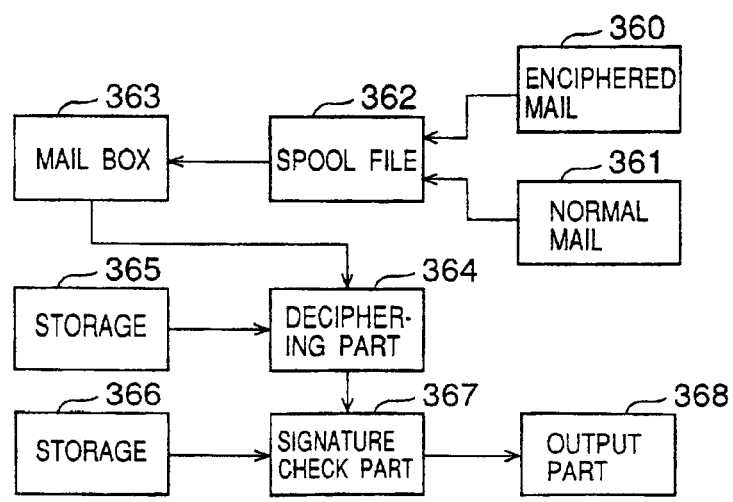
Figure 4:
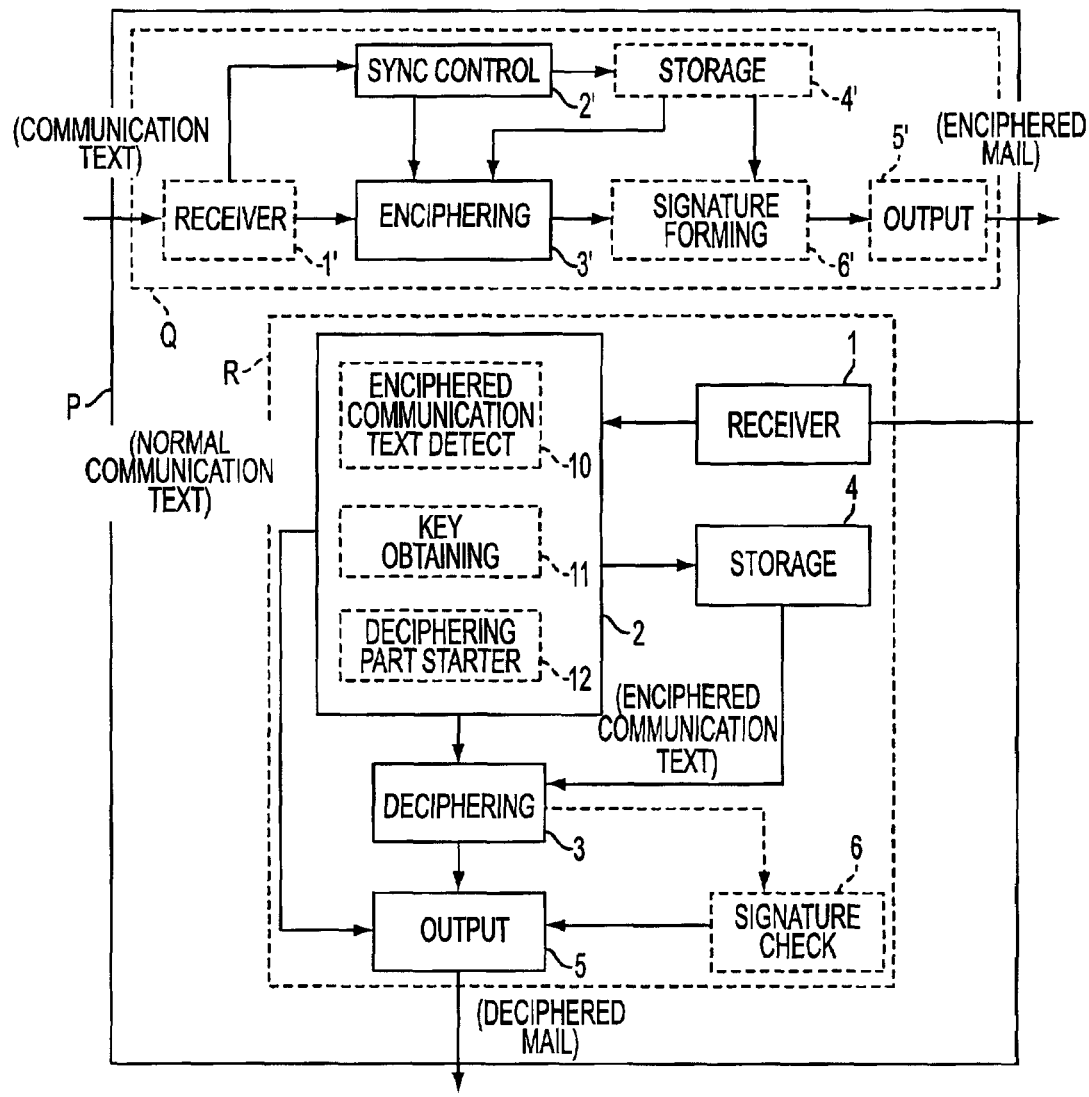
FIG. 4 is a system block diagram for explaining the operating principle of the present invention according to one aspect of the present invention.
Figure 5:
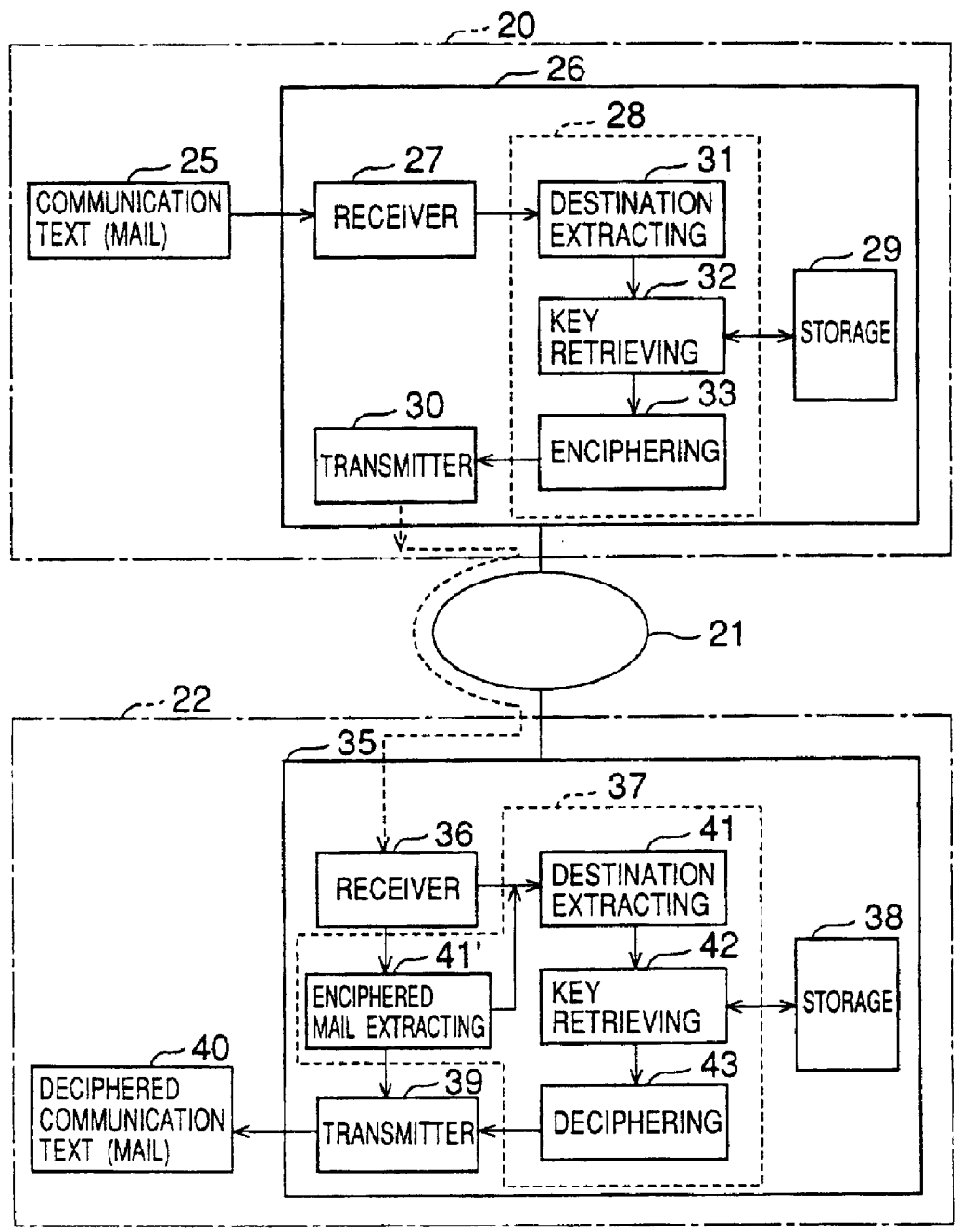
FIG. 5 is a system block diagram for explaining the operating principle of the present invention according to another aspect of the present invention.

First, a description will be given of the operating principle of the present invention, by referring to FIGS. 4 and 5. FIG. 4 is a system block diagram for explaining one aspect of the present invention, and FIG. 5 is a system block diagram for explaining another aspect of the present invention.

According to the one aspect of the present invention, a deciphering unit is automatically started when the deciphering unit receives an enciphered mail. In addition, required secret key and public key are automatically obtained so that the deciphering can be made. On the other hand, when making the enciphering, a series of processes including obtaining keys necessary for the enciphering, starting an enciphering unit and the like are carried out automatically.

In FIG. 4, a user support system P for cryptographic communication includes an enciphering unit Q and a deciphering unit R.

The deciphering unit R includes a receiver 1, a synchronization controller 2, a deciphering part 3, a key storage 4, an output part 5, and a signature check part 6. The synchronization controller 2 automatically carries out the deciphering process including detection of an enciphered communication text (enciphered mail), automatic start of the deciphering part 3, obtaining of necessary key and the like. The deciphering part 3 deciphers the received enciphered mail. The key storage 4 stores a secret key, a public key and the like. The output part 5 outputs the enciphered communication text (mail text, signature check result and the like). The signature check part 6 checks the signature which is transmitted with the enciphered mail.

The synchronization controller 2 includes an enciphered communication text detector 10 for distinguishing the enciphered mail and a normal mail with respect to the mail that is received at the receiver 1, a key obtaining part 11 for obtaining keys (secret key or public key) that are necessary to decipher the enciphered mail, and a deciphering part starter 12 for automatically starting the deciphering part 3 in synchronism with the reception of the enciphered mail.

On the other hand, the enciphering unit Q includes a receiver 1', a synchronization controller 2', an enciphering part 3', a key storage 4', an output part 5', and a signature forming part 6'. The receiver 1' receives the communication text (mail) to be enciphered. A receiver may be used in common as this receiver 1' of the enciphering unit Q and the receiver 1 of the deciphering unit R. The synchronization controller 2' automatically carries out the enciphering process including automatic start of the enciphering part 3', obtaining of necessary key and the like. A part of this synchronization controller 2' may be used in common as a part of the synchronization controller 2 of the deciphering unit R. The enciphering unit 3' enciphers the mail. The key storage 4' stores a secret key, a public key and the like. The output part 5' outputs the enciphered mail. An output part may be used in common as this output part 5' and the output part 5 of the deciphering unit R. The signature part 6' makes the signature.

[Operation of the Deciphering Unit R]

The receiver 1 receives the mail that is transmitted from a network which may be an internal network or an external network. In the synchronization controller 2, the enciphered communication text detector 10 determines whether the received mail is an enciphered mail or a normal mail (mail of a normal text). The normal mail is transferred to the output part 5 without being passed through the deciphering part 3.

On the other hand, when the received mail is the enciphered mail, the input of the enciphered mail is notified to the key obtaining part 11, and the key obtaining part 11 obtains from the key storage 4 the keys that are necessary for the deciphering. In addition, the deciphering part starter 12 starts the deciphering part 3. Hence, the enciphered mail is deciphered in the deciphering part 3 using the obtained key. In addition, if the signature check is required, the signature check part 6 is started and the signature check is made. The deciphered mail, and the signature check result if the signature exists, are transferred to the output part 5. The output part 5 outputs the deciphered mail text, and the signature check result if the signature exists.

[Operation of the Enciphering Unit Q]

The receiver 1' receives the communication text to be output to the external network. The key necessary for the enciphering is retrieved from the key storage 4' based on an instruction from the synchronization controller 2'. In addition, the enciphering part 3' is started based on an instruction from the synchronization controller 2'. The communication text (normal text) is enciphered in the enciphering unit 3' using the key that is retrieved from the key storage 4'. Moreover, if the signature is required, the synchronization controller 2' starts the signature forming part 6' and makes the signature. The enciphered communication text (mail) is transferred to the output part 5' and is output to the external network.

Therefore, the synchronization controller 2 automatically determines whether or not the received mail is the enciphered mail, obtains the keys necessary for the deciphering, and automatically starts the deciphering part 3. For this reason, it is possible to greatly reduce the burden on the user when deciphering the enciphered mail. In addition, when making the enciphering, the series of processes including obtaining of the necessary key, making the enciphering and the like can be made automatically. As a result, it is possible to simply carry out the cryptographic communication.

According to the other aspect of the present invention, a mail which needs to be enciphered out of mails which are made is automatically passed through an enciphering unit and enciphered before being output to an external network. Alternatively, all documents output to the external network are automatically enciphered. Furthermore, when the enciphered mail is received, the enciphered mail is automatically deciphered by being passed through a deciphering unit of the network which received the enciphered mail, so that the deciphered mail is transferred to a user at a destination.

In FIG. 5, a system 20 (A) is an internal network such as a LAN, and is connected to an external network 21. The external network 21 is a commercial network for use by an unspecified larger number of users. A system 22 (B) is an internal network such as a LAN, and is connected to the external network 21.

In the system 20 (A), a communication text (mail) 25 is made by the user A of the system 20. An enciphering unit 26 enciphers the mail 25. This enciphering unit 26 includes a receiver 27, an enciphering processor 28, a key storage 29, and a transmitter 33. The receiver 27 receives the mail 25 which is made in the system 20 and is to be output to the external network 21. The enciphering processor 28 enciphers the mail 25 that is received by the receiver 27. The key storage 29 stores as a database secret keys and public keys of the users connected to the system 20 as well as the public keys of the users (including the user B) of the other systems (including the system 22). The transmitter 30 outputs the enciphered mail to the external network 21.

In addition, the enciphering processor 28 includes a destination extracting part 31, a key retrieving part 32, and an enciphering part 33. The destination extracting part 31 extracts a destination of the mail 25 which is made in the system 20. The key retrieving part 32 retrieves the key storage 29 based on the destination of the mail 25, and obtains the key necessary for the enciphering. The enciphering part 33 enciphers the received mail 25 using the key that is obtained in the key retrieving part 32.

On the other hand, in the system 22, a deciphering unit 35 includes a receiver 36, a deciphering processor 37, a key storage 38, and a transmitter 39. The receiver 36 receives a mail which is input to the system 22 from the external network 21, and transfers this mail to the user B at the destination within the system 22. The deciphering processor 37 deciphers the mail received by the receiver 36. The key storage 38 stores as a database the secret keys, the public keys, and the public keys of other systems (including the system 20) that are necessary to decipher the received enciphered mail. The transmitter 39 transfers the deciphered mail to the user B of the system 22. In addition, a deciphered communication text (mail) 40 has been deciphered in the deciphering unit 35 and is transferred to the user B at the destination within the system 22.

The deciphering processor 37 includes a destination extracting part 41, an enciphered mail extracting part 41', a key retrieving part 42, and a deciphering part 43. The destination extracting part 41 extracts the destination of the mail received by the receiver 36. The enciphered mail extracting part 41' determines whether the received mail is an enciphered mail or a normal mail. The key retrieving part 42 retrieves the key necessary for the deciphering from the key storage 38 based on the destination that is extracted in the destination extracting part 41. The deciphering part 43 deciphers the received enciphered mail using the key that is retrieved in the key retrieving part 42.

[Operation of the Enciphering Unit]

The enciphering unit 26 shown in FIG. 5 is provided in a terminal equipment defined in the network system of the system 20 or, in a network connecting equipment which connects the internal network forming the system 22 to the external network 21.

For the sake of convenience, it will be assumed that the user A of the system 20 makes the communication text (mail) 25 which has the user B of the system 22 as its destination.

In this case, the mail 25 is received by the receiver 27 of the enciphering unit 26. The destination extracting part 31 extracts the destination (user B) from the mail 25. The key retrieving part 32 retrieves the key from the key storage 29 based on the destination (user B) extracted in the destination extracting part 31. The retrieved key is necessary to encipher the mail 25 that is made by the user A, and this key is notified to the enciphering part 33. The retrieved key is a public key of the user B, a secret key of the user A if the signature is required, or the like. The enciphering part 33 enciphers the text of the mail 25 using the public key of the user B, and makes the signature using the secret key of the user A if necessary.

The transmitter 30 outputs the mall 25 which has been enciphered to the external network 21.

In order for the mail 25 that is made by the user A to pass through the enciphering unit 26, the user B is specified in the mail address as the destination, and the address of the terminal equipment to which the enciphering unit 26 belongs is specified. Alternatively, the enciphering unit 26 is provided in the network connecting equipment which connects the system 20 and the external network 21, and the documents output from the system 20 to the external network 21 are all automatically passed through the enciphering unit 26 and enciphered.

[Operation of the Deciphering Unit]

For the sake of convenience, it will be assumed that the enciphered mail made by the user A of the system 20 and having the user B of the system 22 as its destination is input from the external network 21.

The enciphered mail is input to the deciphering unit 35 via the external network 21, and the receiver 36 inputs the enciphered mail from the user A. The enciphered mail extracting part 41' determines whether the received mail is an enciphered mail or a normal mail. If the received mail is the normal mail, the received mail is transferred to the transmitter 39 without being passed through the deciphering unit 43. On the other hand, if the received mail is the enciphered mail, the destination extracting part 41 extracts the destination from a mail header of the enciphered mail, and it is found that the destination is the user B. The key retrieving part 42 retrieves the key necessary for the deciphering (secret key of the user B, public key of the user A or the like) from the key storage 38 based on the destination that is extracted in the destination extracting part 41.

The deciphering part 43 deciphers the enciphered mail using the key that is retrieved in the key retrieving part 42. The transmitter 39 transfers the deciphered mail to the user B of the system 22, that is, to the destination.

In order for all of the mails input from the external network 21 to pass through the deciphering unit 35, there must be an advance understanding when the user A of the system 20 writes the mail address, so that the user A specifies the address of the deciphering unit 35 of the system 22 in addition to the address of the user B. Alternatively, the deciphering unit 35 may be provided in the network connecting equipment which connects the external network 21 and the system 22, so that all of the mails input from the external network 21 to the network 22 are automatically passed through the deciphering unit 35 and the enciphered mails are automatically deciphered.

The system 20 and the system 22 exist independently. For this reason, the enciphered mail that is deciphered in the system 22 does not have to be enciphered by the enciphering unit 27 having the construction shown in the system 20 in FIG. 5. In addition, the mail that is enciphered in the system 20 does not need to be enciphered on the precondition that it will be deciphered by the deciphering unit 35 having the construction shown in the system 22 in FIG. 5.

Therefore, the enciphering and deciphering can be made fully automatically without having to carry out the troublesome operations such as obtaining the keys at the user who makes the enciphered mail and at the user B who receives the enciphered mail, starting the enciphering part and the deciphering part and the like. For this reason, it is possible to simply make the cryptographic communication without the user having to be aware that the cryptographic communication is to be made.

Next, a description will be given of a first embodiment of the user support system for cryptographic communication according to the present invention.

Figure 6:
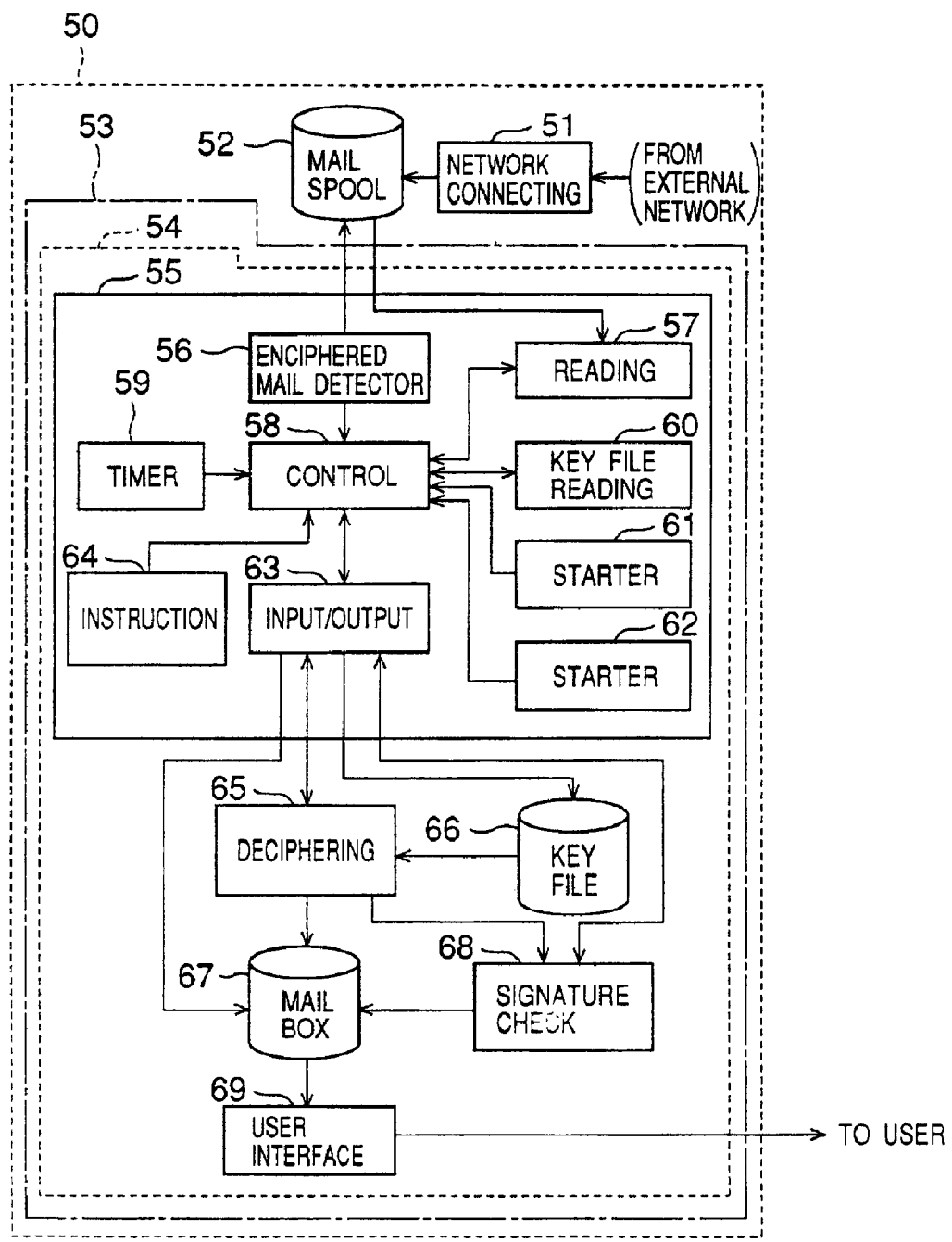
FIG. 6 is a system block diagram showing a first embodiment of a user support system for cryptographic communication according to the present invention.

FIG. 6 shows the construction of the first embodiment. More particularly, FIG. 6 shows the construction of a deciphering unit in conformance with the one aspect of the present invention described above with reference to FIG. 4.

In FIG. 6, a system 50 includes a plurality of terminal equipments 53 (only one shown), and is connected to an external network (not shown) via a network connecting equipment 51. A mail spool 52 stores mails input to the system 50 from the external network. The terminal equipment 53 includes a deciphering unit 54.

The deciphering unit 54 includes a synchronization controller 55, a deciphering part 65, a key file 66 which corresponds to the key storage 4 shown in FIG. 4, a mail box 67, a signature check part 68, and a user interface 69. The user interface 69 outputs the normal mail and the deciphered mail to a display, printer or the like.

The synchronization controller 55 includes an enciphered mail detector 56, a reading part 57, a controller 58, a timer 59, a key file reading part 60, a deciphering part starter 61, a signature check part starter 62, an input/output part 63, and a storage instruction part 64.

The enciphered mail detector 56 periodically retrieves the mail having the terminal equipment 53 as its destination from the mail spool 52. In addition, the enciphered mail detector 56 determines whether the mail transmitted to the terminal equipment 53 is an enciphered mail or a normal mail. The reading part 57 reads from the mail spool 52 the mail having the terminal equipment 53 as its destination. The controller 58 controls various parts of the synchronization controller 55. The timer 59 determines the time of the periodical access from the enciphered mail detector 56 to the mail spool 52.

The key file reading part 60 retrieves the key from the key file 66. The deciphering part starter 61 starts the deciphering part 65, and the signature check part starter 62 starts the signature check part 68. The input/output part 63 outputs control signals to various parts of the terminal equipment 53, and receives signals such as a deciphering end notification from the deciphering part 65. The storage instruction part 64 instructs the storage to the mail box 67. In other words, the storage instruction part 64 instructs storage of the normal mail to the mail box 67 or, instructs storage of the mail deciphered in the deciphering part 65 to the mail box 67.

The operation of the deciphering unit shown in FIG. 6 will be described later.

Figure 7:
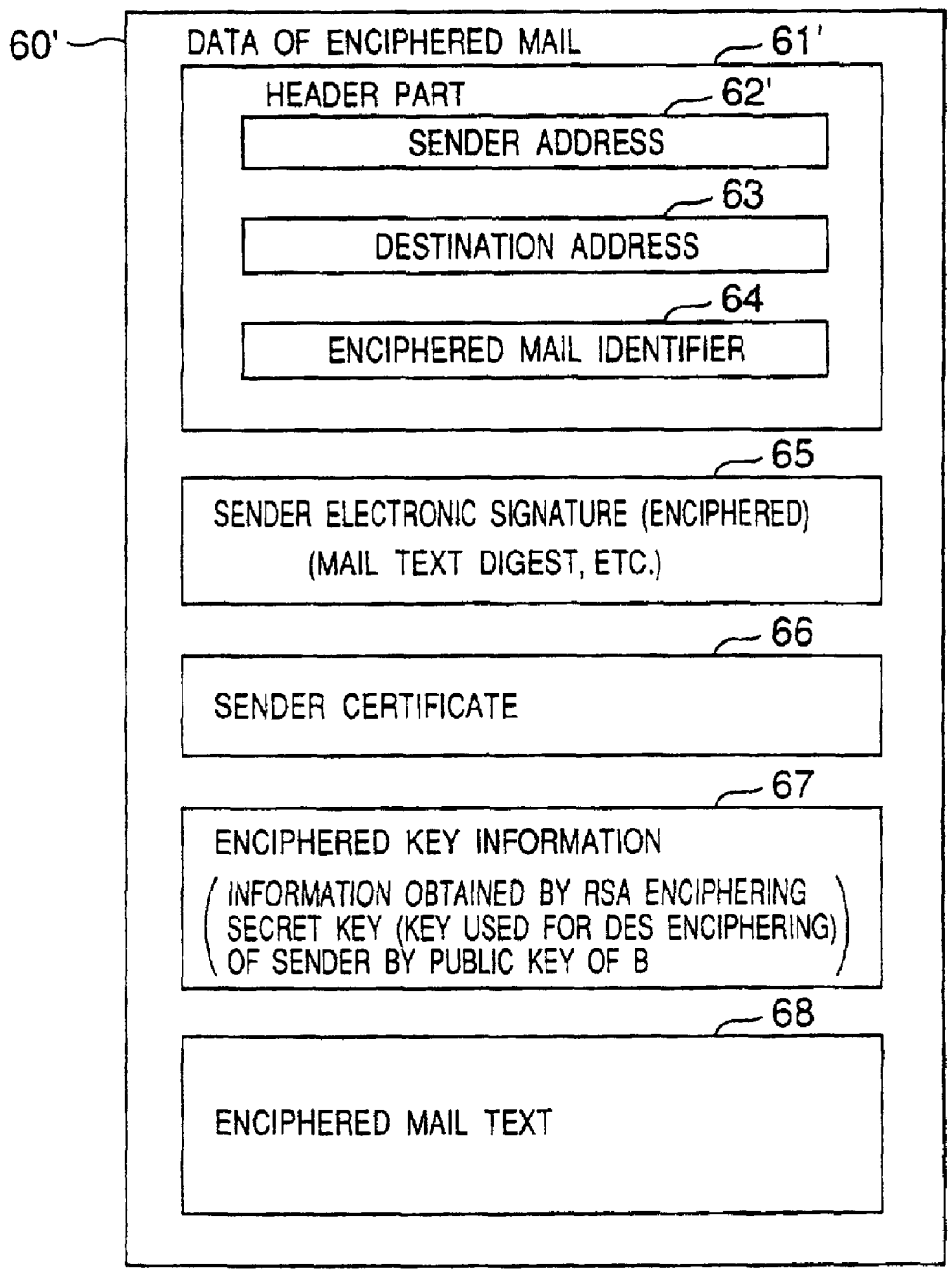
FIG. 7 is a diagram showing an embodiment of a data structure of an enciphered mail in the first embodiment.

FIG. 7 shows an embodiment of a data structure of an enciphered mail used in this first embodiment. In FIG. 7, data 60' related to the enciphered mail includes a header part 61', a sender electronic signature 65, a sender certificate 66, enciphered key information 67, and enciphered mail text 68.

The header part 61' includes a sender address 62', a destination address 63, and an enciphered mail identifier 64 which indicates the kind of enciphered mail and normal mail.

The sender electronic signature 65 includes an enciphered digest or the like of the mail text. The sender certificate 66 certifies that the sender is the true or real person. The enciphered key information 67 is transmitted from the sender and includes information related to the secret key which is used by the sender A to encipher the mail text according to the DES system and is further enciphered by the public key of the receiving user B, information related to the public key of the sender A used by the sender A to encipher the electronic signature, and the like.

Figure 8:
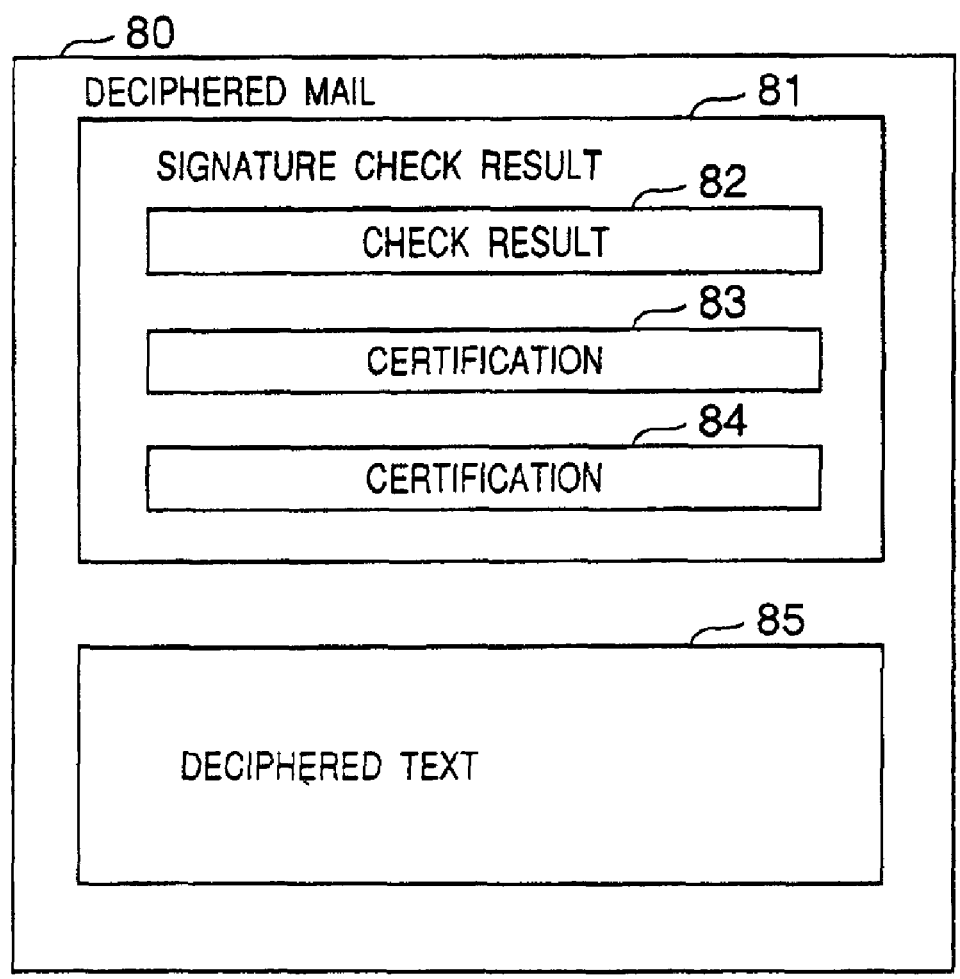
FIG. 8 is a diagram showing the structure of a deciphered mail in the first embodiment.

FIG. 8 shows the structure of a deciphered mail used in this first embodiment. In FIG. 8, a deciphered mail 80 includes a signature check result 81 and a deciphered text 85.

The signature check result 81 includes a check result with respect to the mail text, and certifications 83 and 84. The check result 82 indicates that the tampering or the like has not been made with respect to the mail text. The certification 83 certifies that the sender is the true or real person. In addition, the certification 84 relates to the certification issuing office, and indicates that the certification of the sender is correct.

Figure 9:
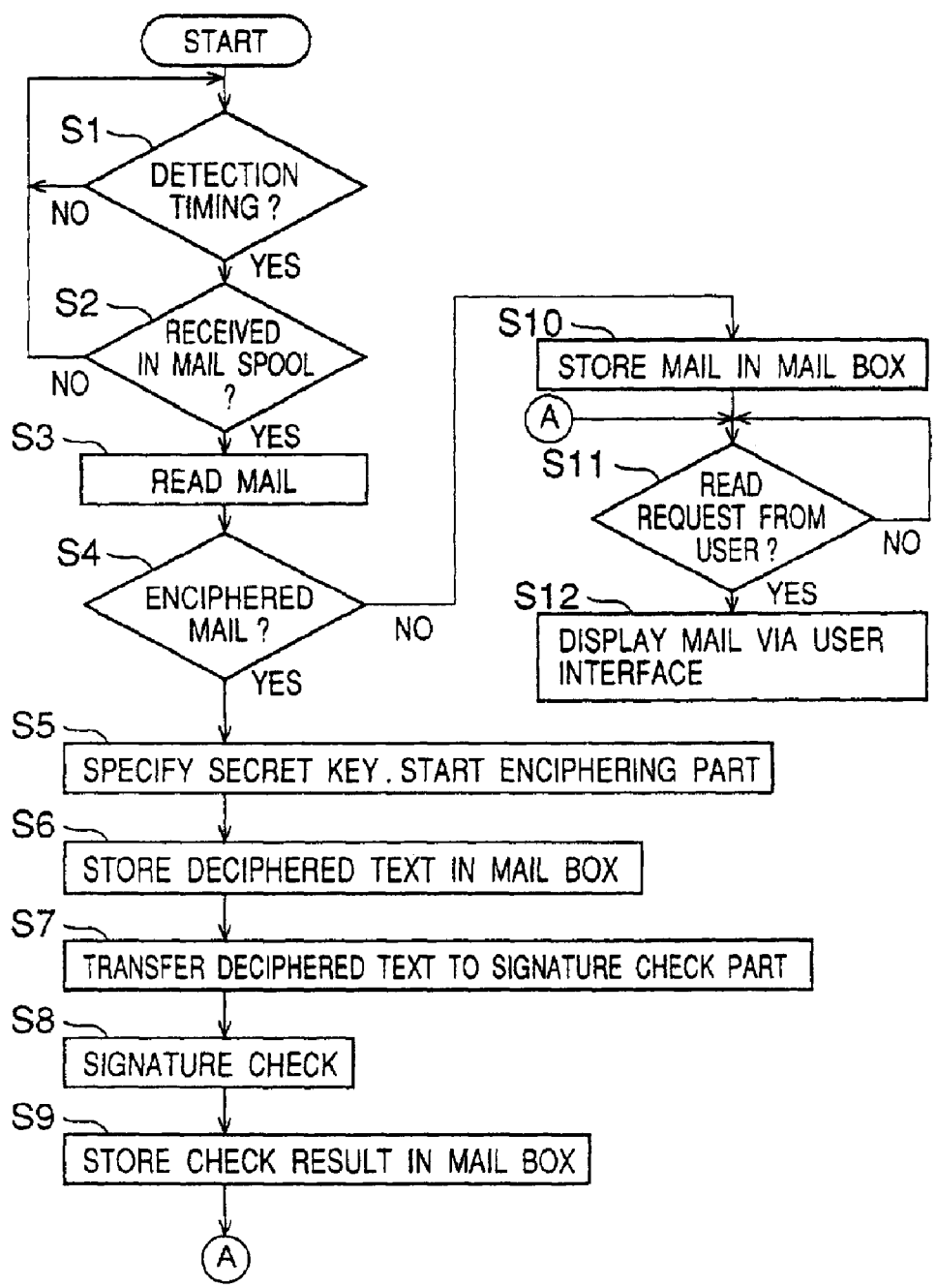
FIG. 9 is a flow chart for explaining the operation of a deciphering unit of the first embodiment.

Next, a description will be given of the operation of the first embodiment shown in FIG. 6, by referring to FIG. 9. FIG. 9 is a flow chart for explaining the operation of the deciphering unit of the first embodiment.

In FIG. 6, the exchanges among the various parts of the synchronization controller 55 are made via the controller 58. In addition, the exchanges among the synchronization controller 55 and the various parts (for example, the deciphering part 65) of the deciphering unit 54 are controlled by the controller 58 of the synchronization controller 55 via the input/output part 63 of the synchronization controller 55.

The mail input from the external network is stored in the mail spool 52 via the network connecting equipment 51. A step S1 shown in FIG. 9 decides whether or not it is a detection timing. In other words, the deciphered mail detector 56 periodically makes access to the mail spool 52 in response to an instruction from the timer 59. If the decision result in the step S1 is YES, a step S2 searches the mails stored in the mail spool 52 and decides whether or not a mail addressed to the terminal equipment 53 is received and stored in the mail spool 52. If the decision result in the step S2 is YES, a step S3 reads the mail addressed to the terminal equipment 53 from the mail spool 52. In other words, the controller 58 instructs the reading part 57 to read the mail addressed to the terminal equipment 53 from the mail spool 52, and the reading part 57 reads this mail from the mail spool 52.

A step S4 decides whether or not the read mail is an enciphered mail. In other words, the enciphered mail detector 56 detects whether the read mail is an enciphered mail or a normal mail.

If the decision result in the step S4 is YES and the read mail is an enciphered mail, the controller 58 instructs the deciphering part starter 61 to start the deciphering part 65 in a step S5. A start signal for starting the deciphering part 65 is supplied to the deciphering part 65 via the input/output part 63 of the synchronization controller 55, thereby starting the deciphering part 65. In addition, the key file reading part 60 obtains from the key file 66 the key that is necessary for the deciphering and supplies the key to the deciphering part 65 in this step S5.

A step S6 stores the deciphered mail in the mail box 67. In other words, the deciphering part 65 deciphers the enciphered mail using the key obtained from the key file 66, and obtains the deciphered mail. In addition, when the end of this deciphering process is notified from the deciphering part 65 to the input/output part 63 of the synchronization controller 55, the deciphered mail is stored in the mail box 67 in response to an instruction from the storage instruction part 64.

In a step S7, a start control signal for the signature check part 68 is supplied to the signature check part 68 via the input/output part 63 of the synchronization controller 55 in response to a start instruction from the signature check part starter 62. Furthermore, the deciphered mail is supplied to the signature check part 68. In a step S8, the signature check is made in the signature check part 68.

In a step S9, the signature check part 68 notifies the end of the signature check to the synchronization controller 55 when the signature check ends. This notification of the end of the signature check is input to the input/output part 63 of the synchronization controller 55, and is notified to the storage instruction part 64. Hence, in the step S9, the storage instruction part 64 instructs the signature check part 68 to store the result of the signature check in the mail box 67, and the signature check part 68 stores the signature check result in the mail box 67.

On the other hand, if the mail read by the reading part 57 is a normal mail and the decision result in the step S4 is NO, the normal mail is stored in the mail box 67 in response to an instruction from the storage instruction part 64 in a step S10.

After the step S9 or S10, a step S11 decides whether or not there is a read request from the user. If the decision result in the step S11 is YES, a step S12 outputs the mail stored in the mail box 67 via the user interface 69. For example, the mail stored in the mail box 67 is displayed on a display.

Next, a description will be given of a second embodiment of the user support system for cryptographic communication according to the present invention, by referring to FIG. 10.

Figure 10:
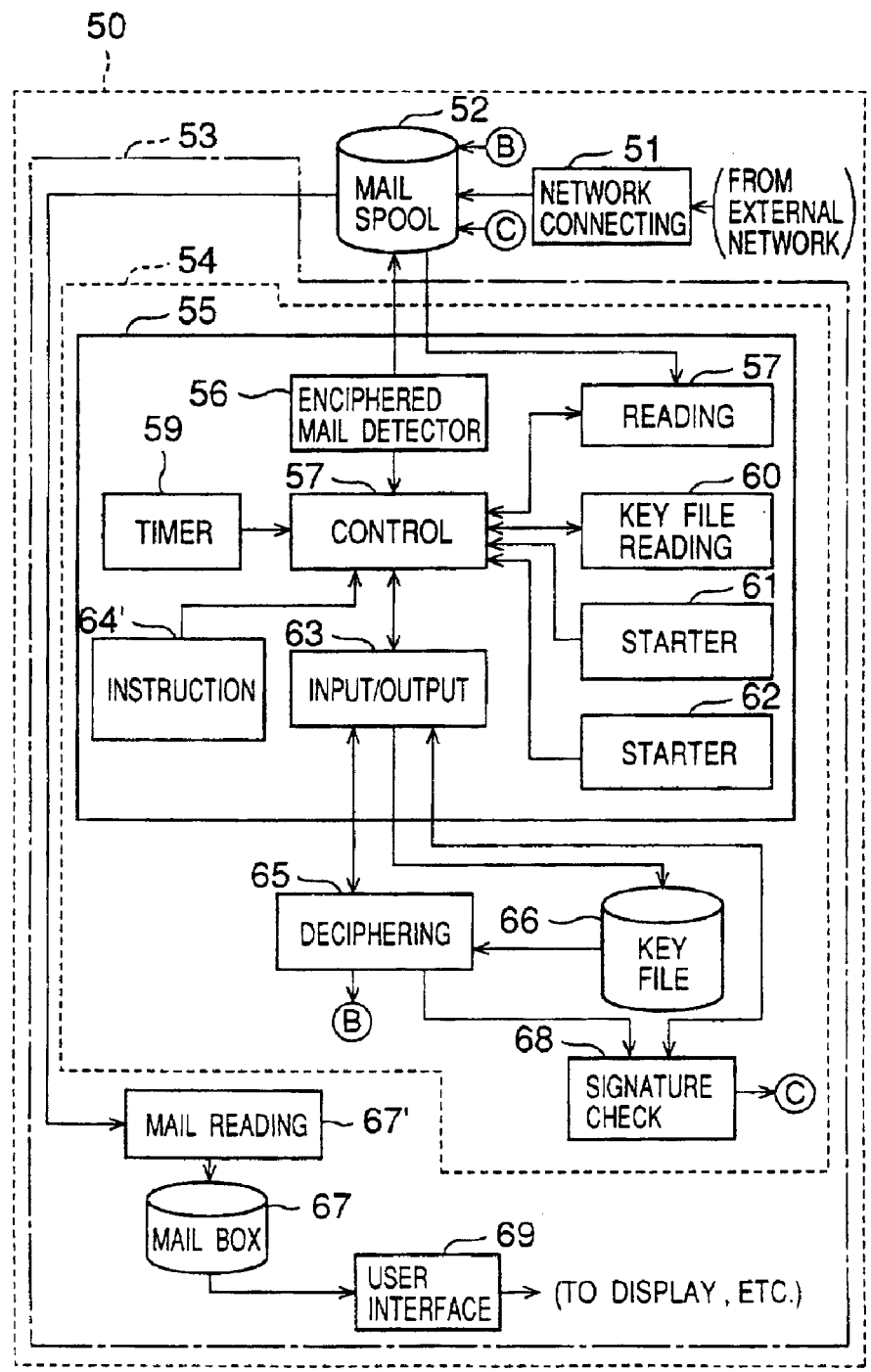
FIG. 10 is a system block diagram showing a second embodiment of the user support system for cryptographic communication according to the present invention.

FIG. 10 shows the construction of the second embodiment. More particularly, FIG. 10 shows the construction of a deciphering unit in conformance with the one aspect of the present invention described above with reference to FIG. 4.

In this second embodiment, the deciphered result of the enciphered mail and the signature check result are again stored in the mail spool 52, so that the deciphered mail can be used in common among the users of the system 50.

In FIG. 10, those parts which are the same as those corresponding parts in FIG. 6 are designated by the same reference numerals, and a description thereof will be omitted.

In FIG. 10, a storage instruction part 64' instructs storage of the deciphered mail and the signature check result into the mail spool 52. A mail reading unit 67' reads the mail from the mail box 67.

Figure 11:
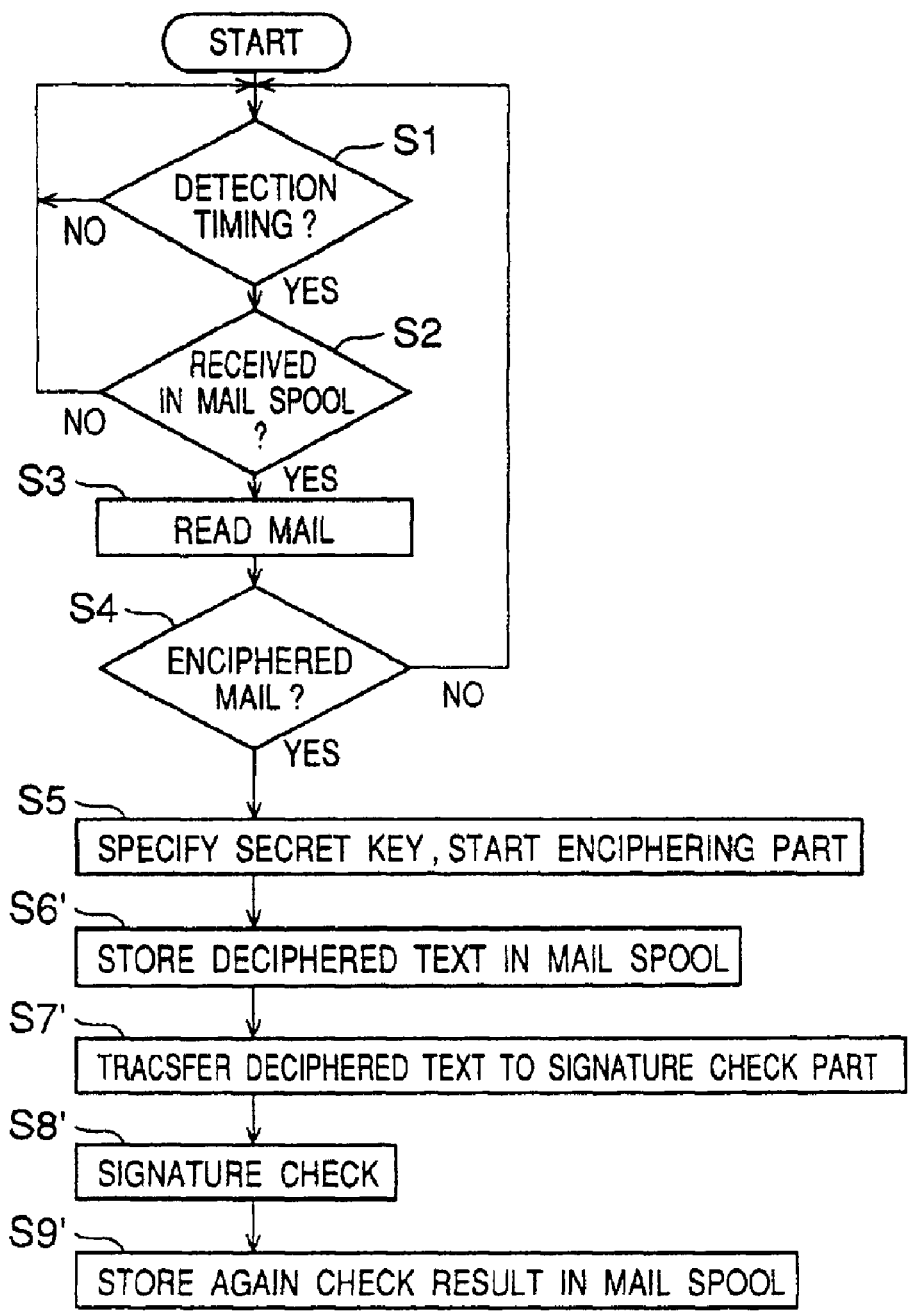
FIG. 11 is a flow chart for explaining the operation of a deciphering unit of the second embodiment.

Next, a description will be given of the operation of the second embodiment shown in FIG. 10, by referring to FIG. 11. FIG. 11 is a flow chart for explaining the operation of the deciphering unit of the second embodiment. In FIG. 11, those steps which are the same as those corresponding steps in FIG. 9 are designated by the same reference numerals.

In FIG. 11, the steps S1 through S5 are the same as the step S1 through S5 shown in FIG. 9. In other words, the step S1 shown in FIG. 11 decides whether or not it is a detection timing. In other words, the deciphered mail detector 56 periodically makes access to the mail spool 52 in response to an instruction from the timer 59. If the decision result in the step S1 is YES, the step S2 searches the mails stored in the mail spool 52 and decides whether or not a mail addressed to the terminal equipment 53 is received and stored in the mail spool 52. If the decision result in the step S2 is YES, the step S3 reads the mail addressed to the terminal equipment 53 from the mail spool 52. In other words, the controller 58 instructs the reading part 57 to read the mail addressed to the terminal equipment 53 from the mail spool 52, and the reading part 57 reads this mail from the mail spool 52.

The step S4 decides whether or not the read mail is an enciphered mail. In other words, the enciphered mail detector 56 detects whether the read mail is an enciphered mail or a normal mail.

If the decision result in the step S4 is YES and the read mail is an enciphered mail, the controller 58 instructs the deciphering part starter 61 to start the deciphering part 65 in the step S5. A start signal for starting the deciphering part 65 is supplied to the deciphering part 65 via the input/output part 63 of the synchronization controller 55, thereby starting the deciphering part 65. In addition, the key file reading part 60 obtains from the key file 66 the key that is necessary for the deciphering and supplies the key to the deciphering part 65 in this step S5.

A step S6' again stores the deciphered mail in the mail spool 52. In other words, the deciphering part 65 deciphers the enciphered mail using the key obtained from the key file 66, and obtains the deciphered mail. In addition, when the end of this deciphering process is notified from the deciphering part 65 to the input/output part 63 of the synchronization controller 55, the deciphered mail is again stored in the mail spool 52 in response to an instruction from the storage instruction part 64'.

In a step S7', a start control signal for the signature check part 68 is supplied to the signature check part 68 via the input/output part 63 of the synchronization controller 55 in response to a start instruction from the signature check part starter 62. Furthermore, the deciphered mail is supplied to the signature check part 68. In a step S8', the signature check is made in the signature check part 68.

In a step S9', the signature check part 68 notifies the end of the signature check to the synchronization controller 55 when the signature check ends. This notification of the end of the signature check is input to the input/output part 63 of the synchronization controller 55, and is notified to the storage instruction part 64'. Hence, in the step S9', the storage instruction part 64' instructs the signature check part 68 to again store the result of the signature check in the mail spool 52, and the signature check part 68 again stores the signature check result in the mail box 67.

The normal mail or the deciphered mail stored in the mail spool 52 is stored in the mail box 67 by the mail reading unit 67'.

On the other hand, if the mail read by the reading part 57 is a normal mail and the decision result in the step S4 is NO, the process returns to the step S1.

Figure 12:
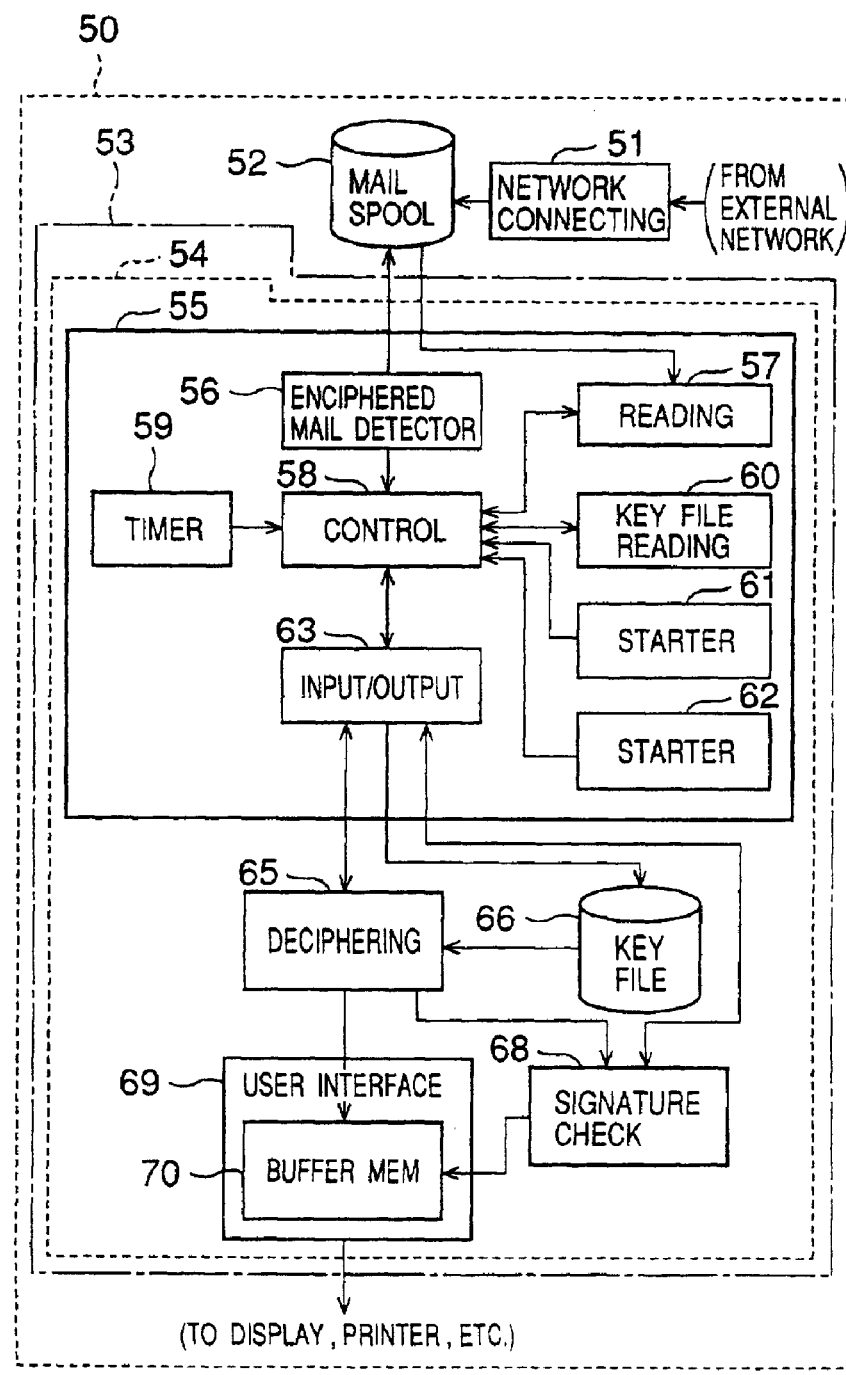
FIG. 12 is a system block diagram showing a third embodiment of the user support system for cryptographic communication according to the present invention.

Next, a description will be given of a third embodiment of the user support system for cryptographic communication according to the present invention, by referring to FIG. 12. FIG. 12 shows the construction of the third embodiment. More particularly, FIG. 12 shows the construction of a deciphering unit in conformance with the one aspect of the present invention described above with reference to FIG. 4.

In this third embodiment, the signature check part 68 makes the signature check while the deciphered result of the enciphered mail is transferred to the user interface 69.

In FIG. 12, those parts which are the same as those corresponding parts in FIG. 6 are designated by the same reference numerals, and a description thereof will be omitted.

In FIG. 12, a buffer memory 70 for display is provided to store the deciphered result from the deciphering part 65 and the signature check result. The deciphered data stored in the buffer memory 70 are output to a display, printer or the like.

Figure 13:
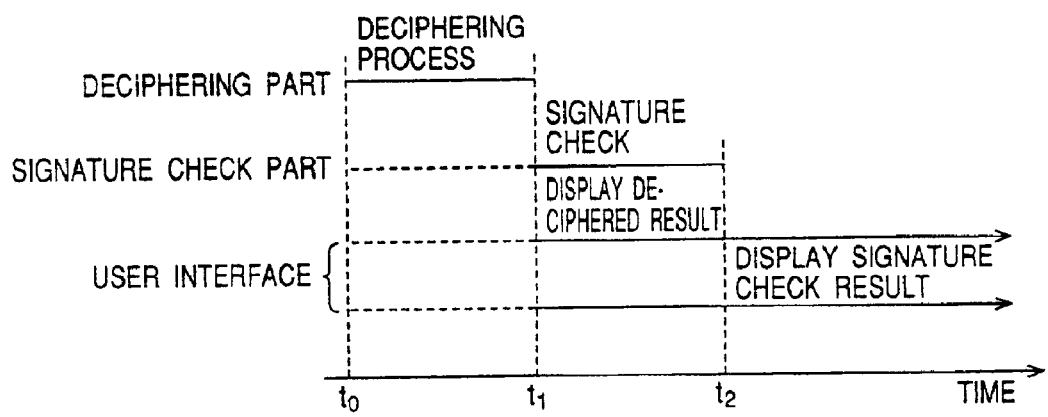
FIG. 13 is a time chart for explaining the operation of a deciphering unit of the third embodiment.

FIG. 13 is a time chart for explaining the operation of the third embodiment, that is, the operation of the deciphering unit of the third embodiment.

The processes starting from the process of obtaining the enciphered mail stored in the mail spool 52 by the synchronization controller 55 up to the process of deciphering the obtained mail in the deciphering part 65 are the same as those of the first embodiment shown in FIG. 6. In other words, the deciphered mail detector 56 periodically makes access to the mail spool 52 in response to the instruction from the timer 59, and the reading part 57 reads the mail from the mail spool 52. The enciphered mail detector 56 determines whether the read mail is an enciphered mail or a normal mail. In the case of the enciphered mail, the deciphering part starter 61 starts the deciphering part 65, and the key file reading part 60 reads from the key file 66 the key necessary for the deciphering and supplies this key to the deciphering part 65. As a result, the enciphered mail is deciphered in the deciphering part 65 using the key.

When the deciphering process of the deciphering part 65 ends, the deciphered result is stored in the buffer memory 70 of the user interface 69 in response to a control instruction from the synchronization controller 55. The deciphered result is displayed on a display or output to a printer or the like. On the other hand, the signature check part 68 of the synchronization controller 55 is started while the deciphered result from the deciphering part 65 is transferred to the buffer memory 70 and the deciphered result is subjected to the display process on the display or the like. Hence, the signature check part 68 makes the signature check based on the deciphered result from the deciphering part 65. When the signature check of the signature check part 68 ends, the signature check result is transferred to the buffer memory 70, and is output to the display, printer or the like.

In the time chart shown in FIG. 13, the deciphering process of the deciphering part 65 starts at a time $t_0$. The transfer of the deciphered result to the buffer memory 70 and for example, the display of the deciphered result are started at a time $t_1$. At the same time $t_1$, the signature check of the signature check part 68 is started. The signature check ends at a time $t_2$, and the signature check result is transferred to the buffer memory 70 and for example, the display of the signature check result starts.

Next, a description will be given of a fourth embodiment of the user support system for cryptographic communication according to the present invention.

Figure 14:
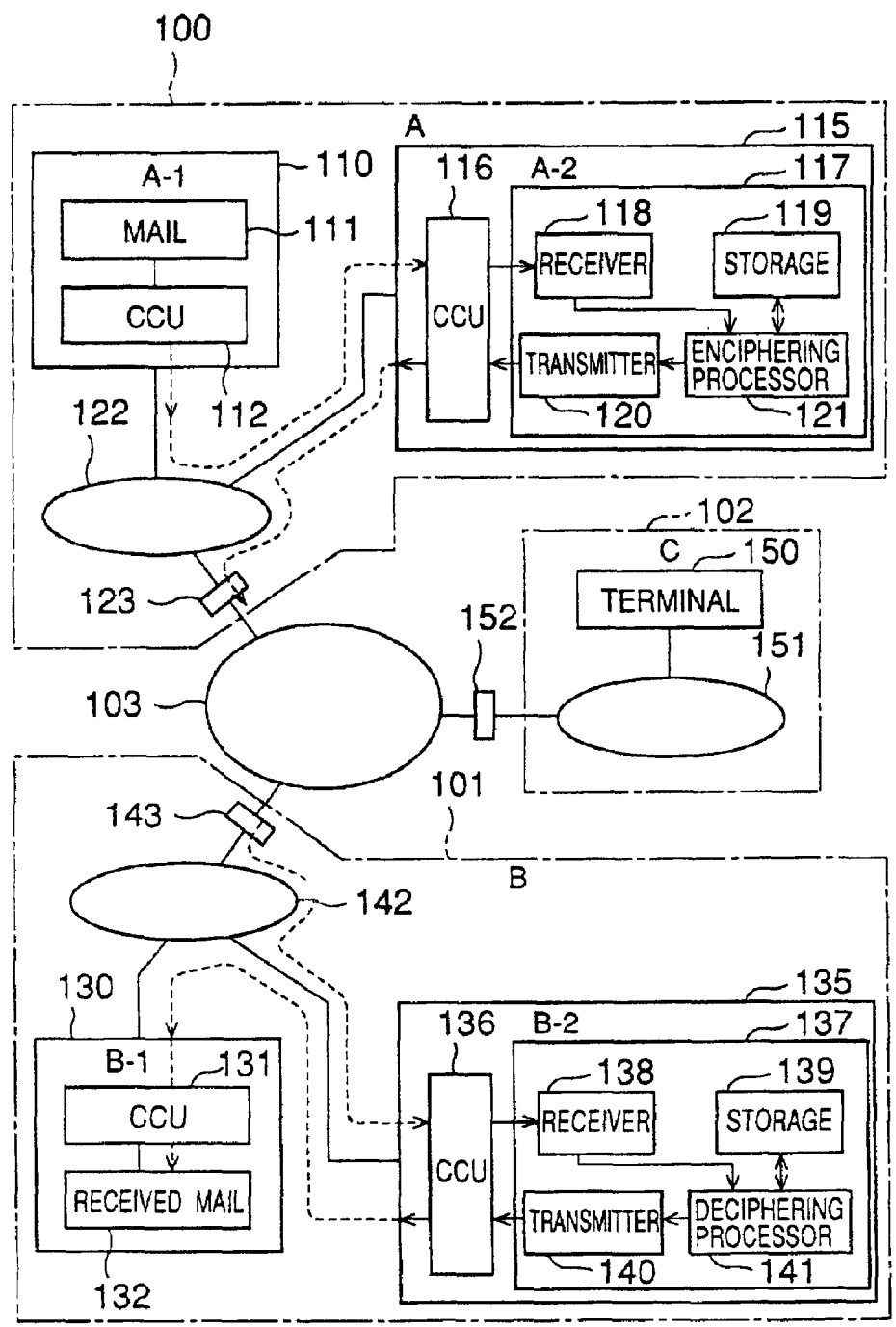
FIG. 14 is a system block diagram showing a fourth embodiment of the user support system for cryptographic communication according to the present invention.

FIG. 14 shows the construction of the fourth embodiment. More particularly, FIG. 14 shows the construction of an enciphering unit and a deciphering unit in conformance with the other aspect of the present invention described above with reference to FIG. 5.

In FIG. 14, network systems 100 (A), 101 (B) and 102 (C) respectively are a LAN or the like. An external network 103 is used by an unspecified larger number of users.

In the network system 100, there are provided a terminal equipment 110 (A-1), a terminal equipment 115 (A-2), a network 122, and a network connecting equipment 123.

The terminal equipment 110 is connected to the network 122, and includes a mail 111 and a communication control unit 112. The mail 111 includes a mail text and a header related to a destination and the like.

The terminal equipment 115 includes a communication control unit 116 and an enciphering unit 117. The enciphering unit 117 includes a receiver 118, a public key storage 119 which will be described later in conjunction with FIG. 15, a transmitter 120, and an enciphering processor 121 which includes an enciphering part and the like which will be described later.

The network connecting equipment 123 connects the network 122 and the external network 103.

In the network system 101, there are provided a terminal equipment 130 (B-1), a terminal equipment 135 (B-2), a network 142, and a network connecting equipment 143.

The terminal equipment 130 includes a communication control unit 131 and a received mail 132.

On the other hand, the terminal equipment 135 includes a communication control unit 136 and a deciphering unit 137. The deciphering unit 137 includes a receiver 138, a secret key storage 139 which will be described later in conjunction with FIG. 17, a transmitter 140, and a deciphering processor 141 which includes a deciphering part and the like which will be described later.

The network connecting equipment 143 connects the network 142 and the external network 103.

In the network system 102, there are provided a terminal equipment 150 (C) and a network 151.

A network connecting equipment 152 connects the network 151 and the external network 103. This network connecting equipment 152 may be provided inside or outside the network system 102.

For the sake of convenience, it will be assumed that the mail 111 made at the terminal equipment 110 of the network system 100 is transmitted to the terminal equipment 130 of the network system 101 as an enciphered mail.

The terminal equipment 110 makes the mail 111 by adding to a mail text a header which includes a destination address of the destination terminal equipment 130 and an address of the terminal equipment 115 within the network system 100 and including the enciphering unit 117. For example, the program statement for making the header is "KURODA % DESTINATION ADDRESS @ ADDRESS OF TERMINAL EQUIPMENT INCLUDING ENCIPHERING UNIT", and specifies the sender, the destination and the address of the enciphering unit. Of course, other methods of specifying the address may be employed, such as the OSI system.

The mail 111 is output to the network 122 from the communication control unit 112. Since the mail 111 is added with the address of the terminal equipment 115, the mail 111 passes through the terminal equipment 115 before being output to the external network 103. The mail 111 is received by the receiver 118 of the terminal equipment 115 via the communication control unit 116, and is transferred to the enciphering processor 121. The enciphering processor 121 extracts the destination (address of the terminal equipment 130) from the mail 111, and obtains the key (for example, the public key of the user B of the destination terminal equipment 130) that is necessary for the enciphering by searching the public key storage 119. The enciphering processor 121 enciphers the mail 111 using the obtained key, and outputs the enciphered mail from the transmitter 120 to the external network 103 via the communication control unit 116.

The enciphered mail is transmitted from the external network 103 to the network system 101 and is received by the terminal equipment 135.

FIG. 14 shows a case where, in the network system 101, the enciphered mail addressed to the network system 101 is automatically input to the terminal equipment 135 having the deciphering unit 137. Hence, the deciphering unit 137 deciphers the enciphered mail and transfers the deciphered mail to the destination terminal equipment 130 of the network system 101.

The enciphered mail input to the network system 101 is thus input to the terminal equipment 135. In order for the enciphered mail to be transferred to the destination terminal equipment 130 via the terminal equipment 135, the user A of the network system 100 specifies the addresses of the terminal equipments 130 and 135 at the destination of the header when making the mail 111, for example. The program statement which specifies the address in such a manner is "KURODA % DESTINATION ADDRESS @ ADDRESS OF TERMINAL EQUIPMENT INCLUDING ENCIPHERING UNIT" which specifies the sender, the destination and the enciphering unit, for example.

The enciphered mail is input to the terminal equipment 135 and is input to the deciphering unit 137 via the communication control unit 136. In the deciphering unit 137, the enciphered mail is received by the receiver 138 and is supplied to the deciphering processor 141. The deciphering processor 141 extracts the destination address (address of the terminal equipment 130) from the enciphered mail, and obtains from the secret key storage 139 the key (for example, the secret key of the user B of the terminal equipment 130) that is necessary for the deciphering in the deciphering processor 141. The deciphering processor 141 deciphers the enciphered mail using the obtained key, and transfers the deciphered mail from the transmitter 140 to the terminal equipment 130 via the communication control unit 136.

The above network system 100 and the network system 101 exist independently. For this reason, the enciphered mail that is deciphered in the system network 101 does not have to be enciphered by the enciphering unit 117 having the construction shown in the system network 100 in FIG. 14. In addition, the mail that is enciphered in the system 100 does not need to be enciphered on the precondition that it will be deciphered by the deciphering unit 137 having the construction shown in the system network 101 in FIG. 14. In other words, the destination of the mail is made as described above, but it is possible to employ the enciphering and deciphering units of the normal terminal equipments within the network systems.

Figures 15, 16:
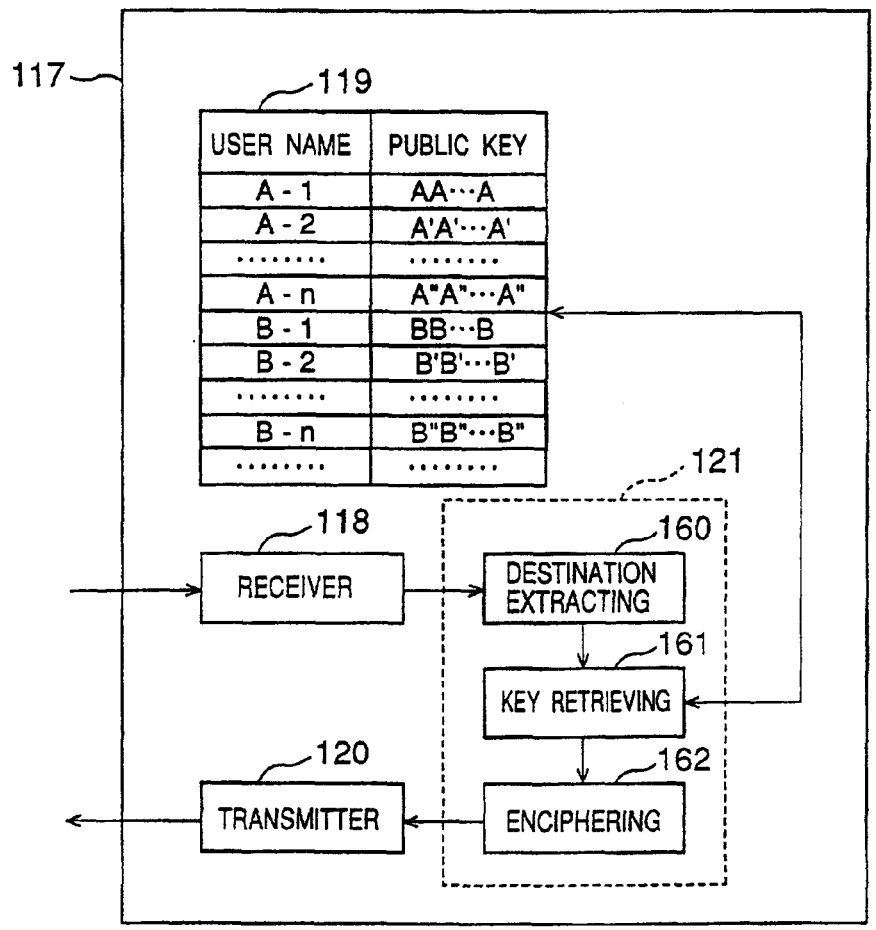
FIG. 15 is a system block diagram showing an enciphering unit of the fourth embodiment.
FIG. 16 is a diagram showing another embodiment of a public key storage of the fourth embodiment.

FIG. 15 shows the enciphering unit of the fourth embodiment.

In FIG. 15, the enciphering unit 117 includes the receiver 118, the public key storage 119, the transmitter 120 and the enciphering processor 121. In this case, a public key database forms the public key storage 119. As shown in FIG. 15, the public key database 119 stores the public keys for each of the user names in each of the network systems.

The enciphering processor 121 includes a destination extracting part 160, a key retrieving part 161 and an enciphering part 162. The destination extracting part 160 extracts the destination address of the mail. The key retrieving part 161 searches the public key database 119 by the destination address (user name), and retrieves the key (for example, the public key of the destination user) that is necessary for the enciphering process. The enciphering part 162 enciphers the mail using the public key or the like of the destination user.

FIG. 16 shows another embodiment of the public key storage of the fourth embodiment. According to the public key database 119 shown in FIG. 16, a single public key is provided in common within the network system. In the particular case shown, a single public key is provided in common within the network system 100 (A), and a single public key is provided in common within the network system 101 (B).

As described above, the content of the mail does not have to be secret within the individual network systems 100 and 101. For this reason, in the enciphering unit 117 shown in FIG. 15, the cryptographic communication can be made by simply preparing a single public key which is common to each of the users of the network systems and a secret key. Therefore, it is possible to reduce the burden on each user to manage the keys.

Figures 17, 18:
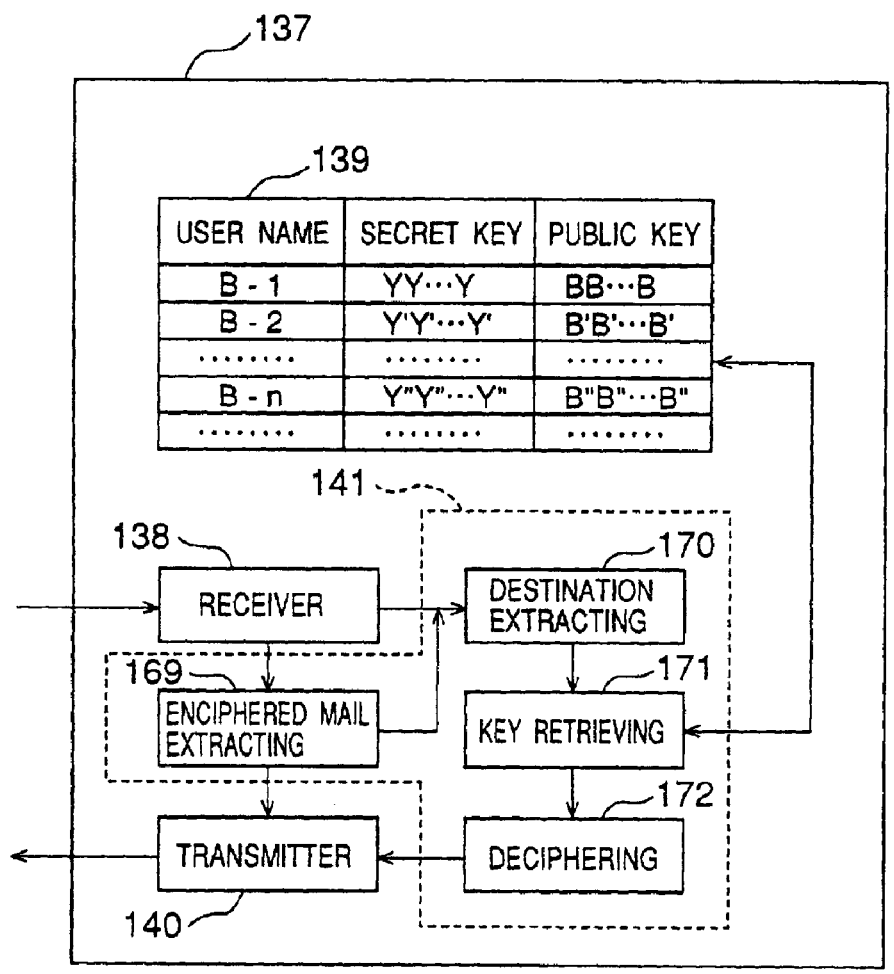
FIG. 17 is a system block diagram showing a deciphering unit of the fourth embodiment.
FIG. 18 is a diagram showing another embodiment of a secret key storage of the fourth embodiment.

FIG. 17 shows the deciphering unit of the fourth embodiment.

In FIG. 17, the deciphering unit 137 includes the receiver 138, the secret key storage 139, the transmitter 140 and the deciphering processor 141. In this case, a secret key database forms the secret key storage 139. As shown in FIG. 17, the secret key database 139 stores the secret keys and the corresponding public keys for each of the users of the network system 101.

The deciphering processor 141 includes an enciphered mail extracting part 169, a destination extracting part 170, a key retrieving part 171, and a deciphering part 172. The enciphered mail extracting part 169 distinguishes the enciphered mail from the normal mail. The destination extracting part 170 extracts the destination address of the mail. The key retrieving part 171 searches the secret key database 139 by the destination address (user name), and retrieves the key (for example, the secret key of the destination) that is necessary for the deciphering process. The deciphering part 172 deciphers the enciphered mail using the public key of the destination user or the like.

FIG. 18 shows another embodiment of the secret key storage of the fourth embodiment. According to the secret key database 139 shown in FIG. 18, each network system has a secret key which is common within the network system and a public key corresponding to this secret key.

As described above in conjunction with FIG. 16, the mail does not have to be secret in the network system 101, and thus, each user does not need a secret key. In this case, the cryptographic communication can be made by simply preparing a single public key which is common to each of the users of the network system and a secret key. Therefore, it is possible to reduce the burden on each user to manage the keys.

Figure 19:
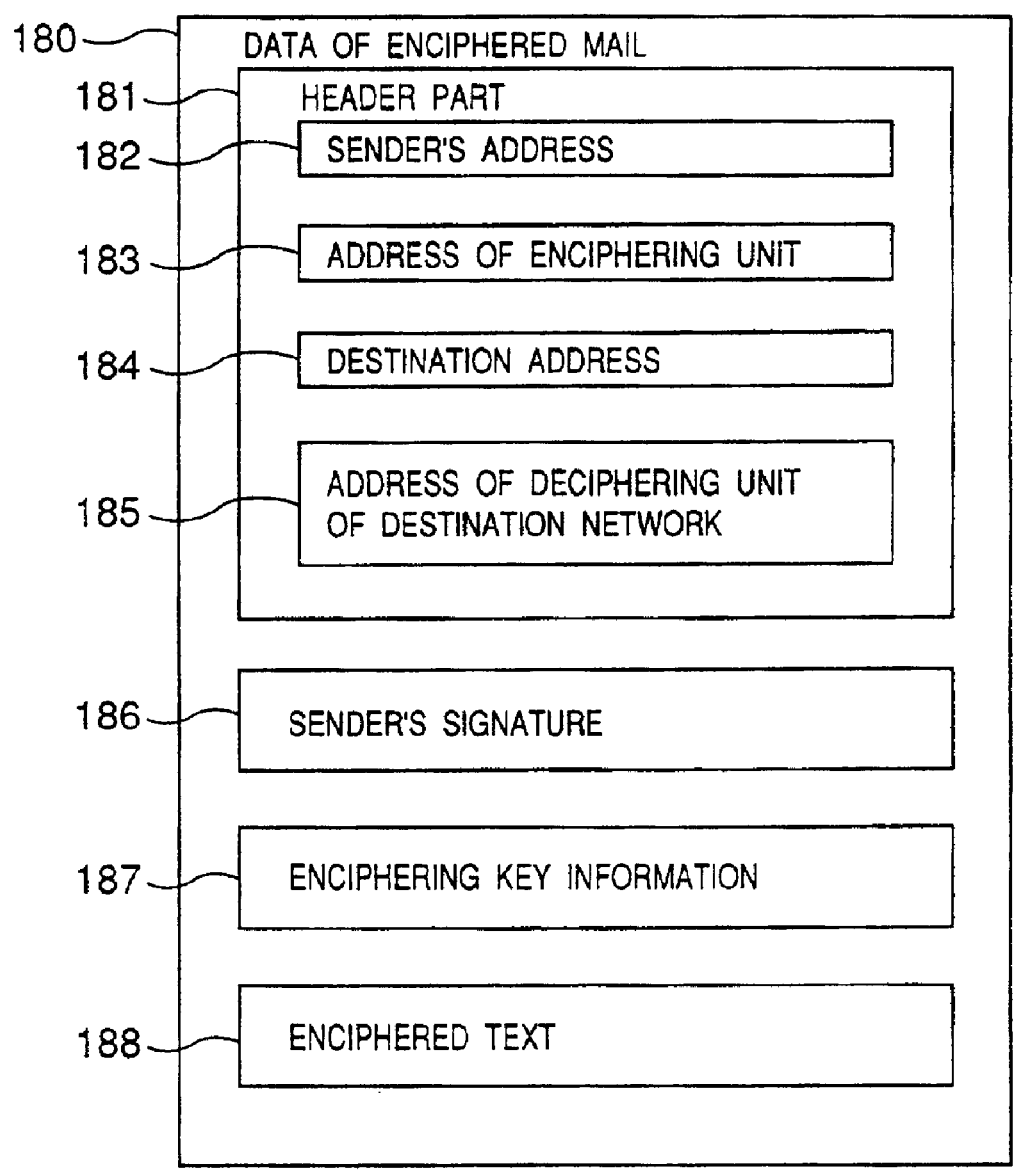
FIG. 19 is a diagram showing an embodiment of a data structure of an enciphered mail in the fourth embodiment.

FIG. 19 shows an embodiment of a data structure of an enciphered mail in the fourth embodiment. FIG. 19 shows the data structure of the enciphered mail for the case where the mail made at the terminal equipment of the transmitting side network system A is enciphered in the predetermined enciphering unit within the network system A, and in the receiving side network system B, the enciphered mail is input to the predetermined terminal equipment having the deciphering unit and the deciphered mail is transferred to the terminal equipment of the network system B.

In FIG. 19, data 180 related to the enciphered mail includes a header part 181, a sender's signature 186, enciphering key information 187, and an enciphered text 188.

The header part 181 includes a sender's address 182, an address 183 of the enciphering unit, a destination address 184, and an address 185 of the deciphering unit in the destination network system. The address 183 relates to the enciphering unit within the sender's network system A. The destination address 184 relates to the user of the network system B to whom the mail is to be transmitted. The address 185 relates to the deciphering unit of the destination network system B, that is, the terminal equipment to which the deciphering unit of the destination network system B belongs.

The enciphering key information 187 relates to information such as the secret key that is necessary to make the deciphering process when the mail is enciphered according to the DES system.

In a case where the destination network system which receives the enciphered mail is such that the enciphered mail is deciphered at each terminal equipment which receives the enciphered mail, the address 185 related to the deciphering unit of the destination network system is not required. In addition, in a case where the transmitting network system enciphers the mail to be transmitted before outputting the same at each terminal equipment which makes the mail, the address 183 related to the enciphering unit is not required.

Next, a description will be given of a fifth embodiment of the user support system for cryptographic communication according to the present invention.

Figure 20:
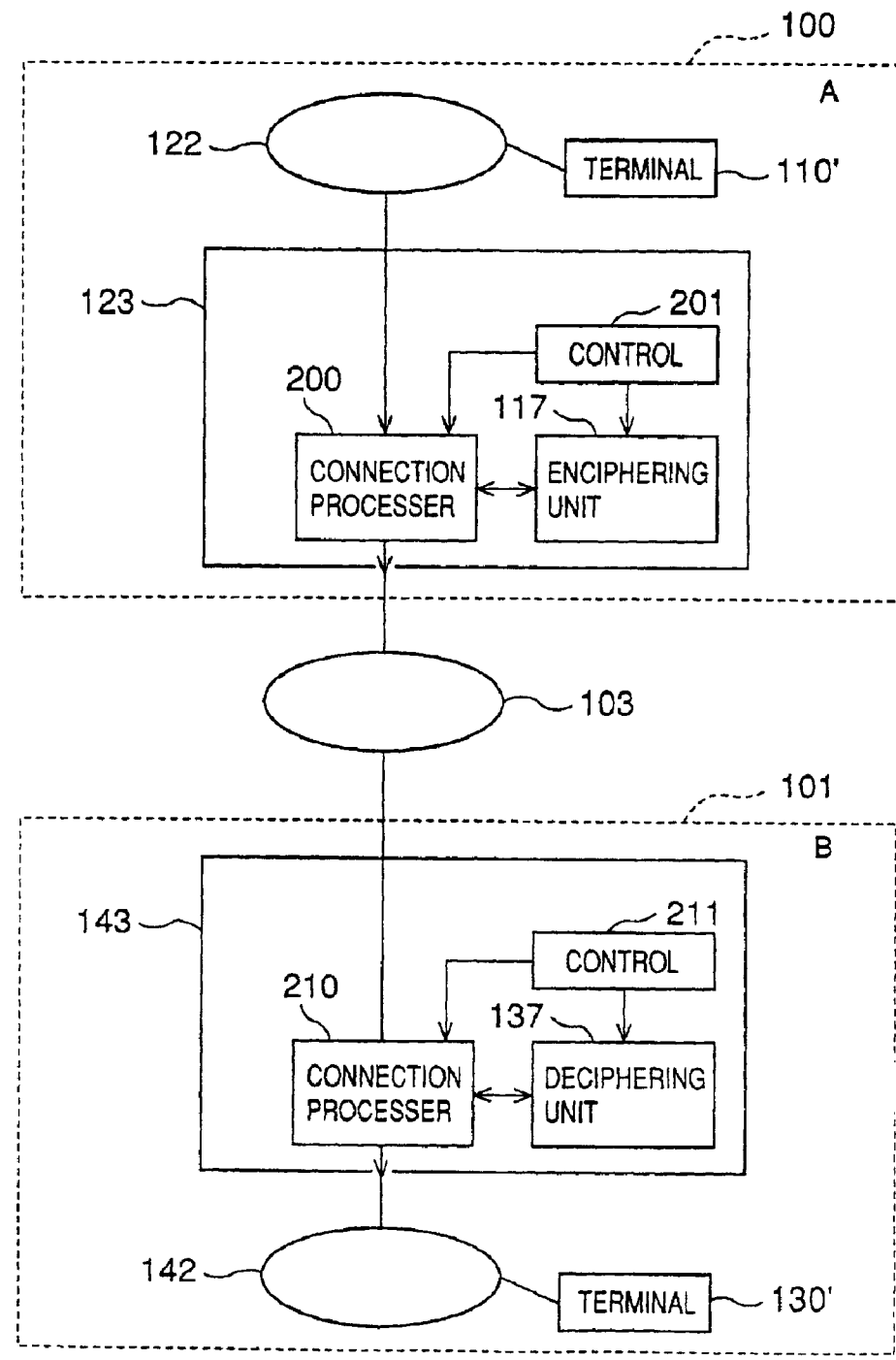
FIG. 20 is a system block diagram showing a fifth embodiment of the user support system for cryptographic communication according to the present invention.

FIG. 20 shows the construction of the fifth embodiment. More particularly, FIG. 20 shows the construction of an enciphering unit and a deciphering unit in conformance with the other aspect of the present invention described above with reference to FIG. 5. In FIG. 20, those parts which are the same as those corresponding parts in FIG. 14 are designated by the same reference numerals, and a description thereof will be omitted.

In this fifth embodiment, the network systems 100 (A) and 102 (B) are connected to the external network 103 via respective network connecting equipments 123 and 132. The enciphering unit 117 is provided within the network connecting equipment 123, and the deciphering unit 137 is provided within the network connecting equipment 143. Hence, all of the mails output from the network system 100 to the external network 103 are automatically enciphered in the enciphering unit 117 within the network connecting equipment 123. On the other hand, all of the enciphered mails input to the network system 101 from the external network 103 are automatically deciphered in the deciphering unit 137 within the network connecting equipment 143.

In other words, in the network system 100, there are provided a terminal equipment 110', the network 122, and the network connecting equipment 123. The network connecting equipment 123 includes the enciphering unit 117, a connection processor 200, and a controller 201. The connection processor 200 carries out processes including the process of transmitting the mail to be output to the external network 103 and the process of receiving the mail from the external network 103 addressed to the network system 100. The controller 201 controls the operation of the network connection equipment 123.

On the other hand, in the network system 101, there are provided a terminal equipment 130', the network 142, and the network connecting equipment 143. The network connecting equipment 143 includes the deciphering unit 137, a connection processor 210, and a controller 211. The connection processor 210 carries out processes including the process of receiving the enciphered mail from the external network 103 addressed to the network system 101 and the process of outputting the mail to the external network 103. The controller 211 controls the operation of the network connection equipment 143.

Accordingly, all of the mails made in the network system 100 are enciphered in the enciphering unit 117 within the network connecting equipment 123 and are output to the external network 103 via the connection processor 200.

On the other hand, all of the enciphered mail input to the network system 101 are deciphered in the deciphering unit 137 and transferred to the destination terminal equipment 130' of the network 142.

In FIG. 20, the network system 100 and the network system 101 may exist independently. In other words, the mail that is enciphered in the enciphering unit 117 within the network system 100 may be deciphered at each terminal equipment that is the destination of the mail. In addition, the mail that is transmitted to the network system 101 may be made in the network system 100 in which each terminal equipment that makes the mail enciphers the mail.

Figure 21:
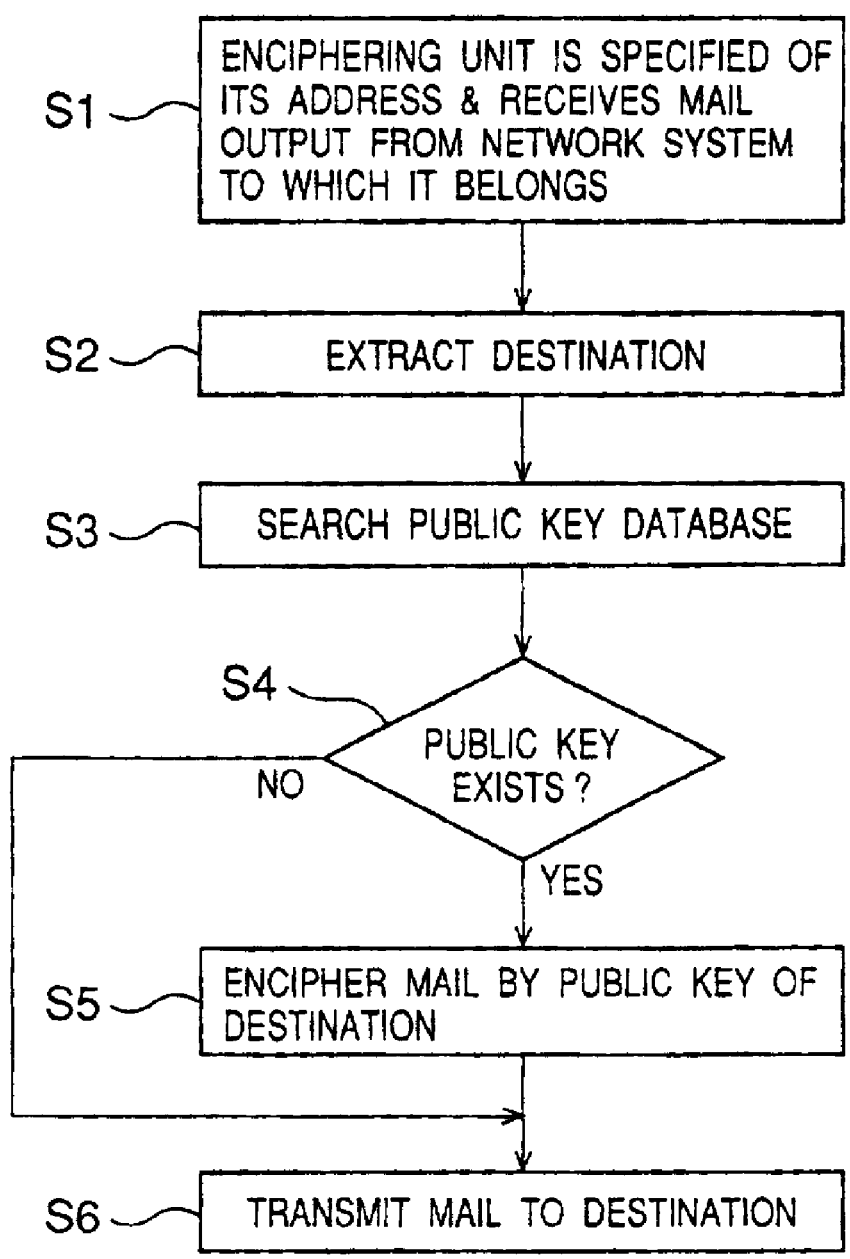
FIG. 21 is a flow chart for explaining the operation of an enciphering unit of the fourth embodiment.

FIG. 21 is a flow chart for explaining the operation of the fourth embodiment described above. More particularly, FIG. 21 shows the operation of the enciphering unit of the terminal equipment in the transmitting network system.

In a step S1 shown in FIG. 21, the address of the enciphering unit 117 shown in FIGS. 14 and 15 is specified, and the enciphering unit 117 receives the mail output from the network system 100 to which this enciphering unit 117 belongs. In a step S2, the destination extracting part 160 extracts the destination which is the terminal equipment 130 (B-1) in the above described case. In a step S3, the key retrieving part 161 searches the public key database 118. A step S4 decides whether or not a public key is retrieved from the public key database 119. The process advances to a step S6 if the decision result in the step S4 is NO.

On the other hand, if the decision result in the step S4 is YES, a step S5 enciphers the mail by the retrieved public key. In other words, the enciphering part 162 enciphers the mail using the public key of the destination, such as the public key of the terminal equipment 130 or the public key that is common to the network system 101 (B). In the step S6, the transmitter 120 transmits the enciphered mail to the destination. More particularly, the enciphered mail is transferred from the transmitter 120 to the network connecting equipment 123, and the network connecting equipment 123 outputs the enciphered mail to the external network 103.

Figure 22:
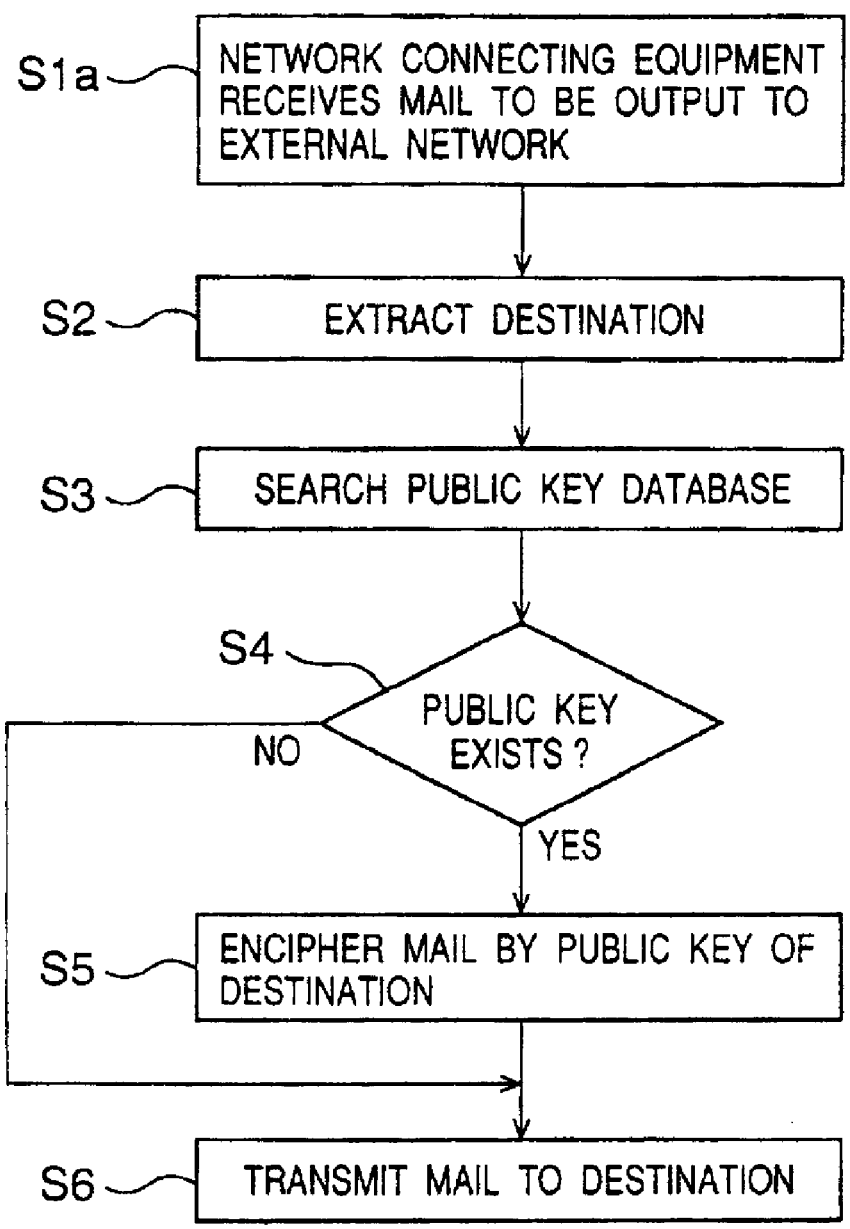
FIG. 22 is a flow chart for explaining the operation of an enciphering unit of the fifth embodiment.

FIG. 22 is a flow chart for explaining the operation of the fifth embodiment described above. More particularly, FIG. 22 shows the operation of the enciphering unit of the terminal equipment in the transmitting network system. Reference should be made to FIGS. 14, 15 and 20 described above.

In a step S1a shown in FIG. 22, the network connecting equipment 123 shown in FIG. 20 receives the mail to be output to the external network 103. In a step S2, the destination extracting part 160 of the enciphering unit 117 extracts the destination which is the terminal equipment 130' (B-1) in the above described case. In a step S3, the key retrieving part 161 searches the public key database 118. A step S4 decides whether or not a public key is retrieved from the public key database 119. The process advances to a step S6 if the decision result in the step S4 is NO.

Figure 23:
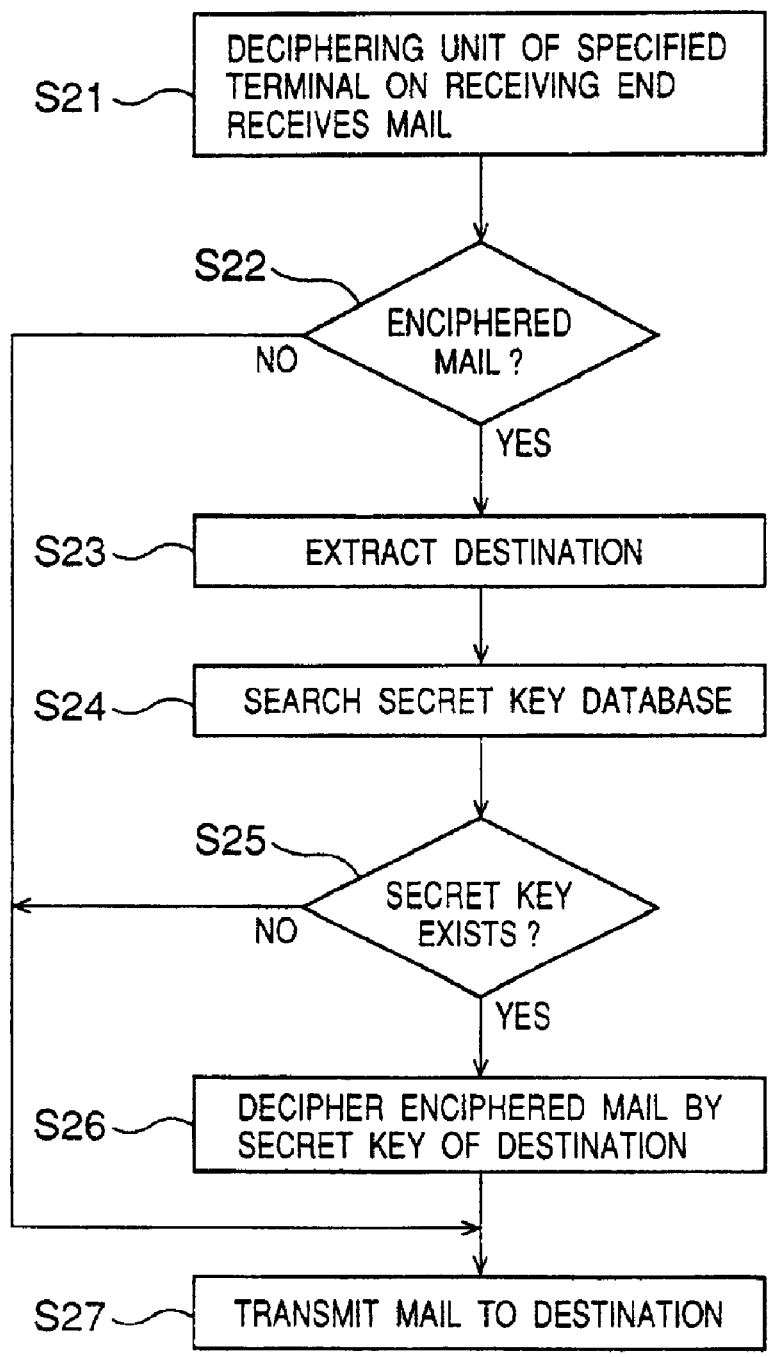
FIG. 23 is a flow chart for explaining the operation of a deciphering unit of the fourth embodiment.

On the other hand, if the decision result in the step S4 is YES, a step S5 enciphers the mail by the retrieved public key. In other words, the enciphering part 162 enciphers the mail using the public key of the destination, such as the public key of the terminal equipment 130' or the public key that is common to the network system 101 (B). In the step S6, the transmitter 120 transmits the enciphered mail to the destination. More particularly, the enciphered mail is transferred from the transmitter 120 to the external network 103 to be transmitted to the destination FIG. 23 is a flow chart for explaining the operation of the fourth embodiment described above. More particularly, FIG. 23 shows the operation of the deciphering unit of the terminal equipment in the receiving network system.

In a step S21 shown in FIG. 23, the deciphering unit 137 shown in FIGS. 14 and 17 of the specified terminal equipment on the receiving end receives the mail. In the above described case, the deciphering unit 137 of the terminal equipment 135 (B-2) receives the mail, In a step S22, the enciphered mail extracting part 169 decides whether or not the received mail is an enciphered mail. In other words, the enciphered mail extracting part 169 determines whether the received mail is an enciphered mail or a normal mail. The process advances to a step S27 if the decision result in the step S22 is NO.

On the other hand, if the decision result in the step S22 is YES, the destination extracting part 170 extracts the destination which is the terminal equipment 130 (B-1) in the above described case in a step S23. In a step S24, the key retrieving part 171 searches the secret key database 139, and a step S25 decides whether or not a secret key is retrieved from the secret key database 139. The process advances to the step S27 if the decision result in the step S25 is NO.

If the decision result in the step S25 is YES, the deciphering part 172 deciphers the enciphered mail using the secret key of the destination in a step S26, such as secret key of the terminal equipment 130 and the secret key that is common to the network system 101. Finally, a step S27 transmits the deciphered mail to the destination which is the terminal equipment 130 in the above described case.

Figure 24:
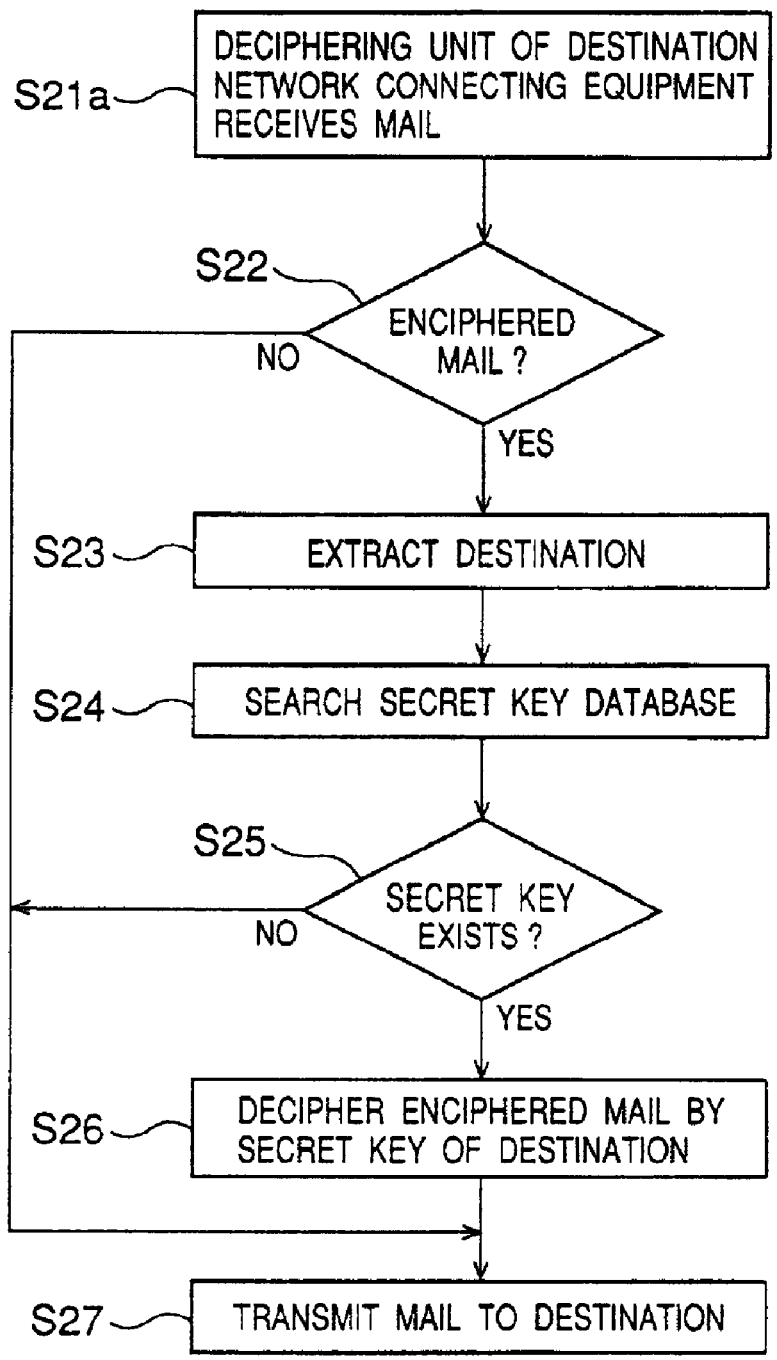
FIG. 24 is a flow chart for explaining the operation of a deciphering unit of the fifth embodiment.

FIG. 24 is a flow chart for explaining the operation of the fifth embodiment described above. More particularly, FIG. 24 shows the operation if the deciphering unit of the terminal equipment in the receiving network system. Reference should be made to FIGS. 14, 17 and 20 described above.

In a step S21a shown in FIG. 24, the deciphering unit 137 shown in FIGS. 14 and 17 of the destination network connecting equipment receives the mail. In the above described case, the deciphering unit 137 of the network connecting equipment 143 of the network system 101 (B) shown in FIG. 20 receives the mail. In a step S22, the enciphered mail extracting part 169 decides whether or not the received mail is an enciphered mail. In other words, the enciphered mail extracting part 169 determines whether the received mail is an enciphered mail or a normal mail. The process advances to a step S27 if the decision resultin the step S22 is NO.

On the other hand, if the decision result in the step S22 is YES, the destination extracting part 170 extracts the destination which is the terminal equipment 130 (B-1) in the above described case in a step S23. In a step S24, the key retrieving part 171 searches the secret key database 139, and a step S25 decides whether or not a secret key is retrieved from the secret key database 139. The process advances to the step S27 if the decision result in the step S25 is NO.

If the decision result in the step S25 is YES, the deciphering part 172 deciphers the enciphered mail using the secret key of the destination in a step S26, such as secret key of the terminal equipment 130 and the secret key that is common to the network system 101. Finally, a step S27 transmits the deciphered mail to the destination which is the terminal equipment 130 in the above described case.

Further, the present invention is not limited to these embodiments, but various variations and modifications may be made without departing from the scope of the present invention.

What is claimed is:

1. Terminal equipment for cryptographic communication in a network system in which a first system and a second system are connected via an external network, said terminal equipment comprising:

an enciphering unit, provided in the first system, enciphering a communication text which includes an address of said enciphering unit and is to be output to a terminal equipment destination having a deciphering unit address on the external network, said enciphering unit comprising:

a first receiver receiving the communication text which is made in the first system and is to be transmitted via the external network;

a first key storage storing keys necessary for a cryptographic communication, the keys stored together and each solely connectedly associated with one of a user and a group of users;

a first key retrieving part retrieving a one of the keys associated with the user from said first key storage based on a destination of the communication text;

an enciphering part enciphering the communication text into an enciphered communication text using the key retrieved by said key retrieving part; and a first transmitter transmitting the enciphered communication text from said enciphering part to the terminal equipment destination on the external network.

2. A cryptographic communication method, comprising:

preparing a message comprising a destination address of a destination an enciphered portion, the enciphered portion comprising a deciphering unit address and an encipher identifier identifying that the and enciphered portion is enciphered;

transmitting the message to the destination; and receiving the message at the destination, determining whether the address is correct and automatically deciphering the unencyphered portion with a deciphering unit having the deciphering unit address responsive to the identifier when the address is correct for the deciphering unit using a key associated with one of a user and a group of users.

* * * * *

UNITED STATES PATENT AND TRADEMARK OFFICE
CERTIFICATE OF CORRECTION

PATENT NO. : 6,922,775 B2
DATED : July 26, 2005
INVENTOR(S) : Hiroaki Kikuchi et al.

It is certified that error appears in the above-identified patent and that said Letters Patent is hereby corrected as shown below:

Column 22,
Line 23, change "Terminal" to -- A terminal --.
Lines 27-28, change "enciphering" to -- configured to encipher --.
Line 34, change "a first receiver receiving" to -- a receiver configured to receive --.
Line 37, change "a first key storage storing" to -- a key storage configured to store --.
Line 41, change "a first key retrieving part retrieving a" to -- a key retrieving part configured to retrieve --.
Line 42, delete "first".
Line 44, change "enciphering" (second occurrence) to -- configured to encipher --.
Line 47, change "a first transmitter transmitting" to -- a transmitter configured to transmit --.
Line 52, after "destination" insert -- and --.
Line 54, after "the" delete "and".
Line 59, change "unencyphered" to -- enciphered --.
Line 61, before "identifier" insert -- encipher --.

Signed and Sealed this

Fourth Day of April, 2006

JON W. DUDAS
*Director of the United States Patent and Trademark Office*